United States Patent [19]
Dilling

[11] Patent Number: 5,996,981
[45] Date of Patent: Dec. 7, 1999

[54] REDUCED SIZE BUSHING FOR BEAM-TYPE AXLE SUSPENSION SYSTEM

[75] Inventor: Scott Allen Dilling, Canton, Ohio

[73] Assignee: The Boler Company, Itasca, Ill.

[21] Appl. No.: 08/841,795

[22] Filed: May 5, 1997

Related U.S. Application Data

[63] Continuation-in-part of application No. 08/704,090, Aug. 28, 1996, abandoned.

[51] Int. Cl.[6] .......................................................... F16F 1/38
[52] U.S. Cl. ............................. 267/153; 267/141; 267/292
[58] Field of Search .............................. 267/141.2, 141.6, 267/141.7, 153, 152, 141, 141.3, 141.4, 141.5, 292–294, 257, 258, 281, 279, 140.12, 219, 140.11; 280/124.1; 248/635, 634; 403/225, 227, 226, 228; 384/273; 428/36.8, 376, 379

[56] References Cited

U.S. PATENT DOCUMENTS

| | | |
|---|---|---|
| 2,375,105 | 5/1945 | Hile . |
| 3,140,081 | 7/1964 | Peterson . |
| 3,191,896 | 6/1965 | Nathan . |
| 3,650,520 | 3/1972 | Vernon et al. . |
| 3,762,747 | 10/1973 | Griffen . |
| 4,157,227 | 6/1979 | Hahle ..................................... 267/141.2 |
| 4,166,640 | 9/1979 | Van Denberg . |
| 4,732,407 | 3/1988 | Oyama et al. . |
| 4,991,868 | 2/1991 | Van Denberg . |
| 5,013,012 | 5/1991 | Jouade ..................................... 180/312 |
| 5,127,668 | 7/1992 | Raidel . |
| 5,170,997 | 12/1992 | Girard et al. ....................... 267/140.12 |
| 5,190,269 | 3/1993 | Ikeda et al. .............................. 267/141 |
| 5,295,670 | 3/1994 | Yoshikazu et al. . |
| 5,531,426 | 7/1996 | Bruhl ................................. 267/140.12 |
| 5,575,461 | 11/1996 | Ihle .......................................... 267/153 |

FOREIGN PATENT DOCUMENTS

| | | |
|---|---|---|
| 0 600 198 A2 | 8/1994 | European Pat. Off. . |
| 1251719 | 3/1960 | France ................................... 267/153 |
| 2 473 662 | 7/1981 | France . |
| 37 19 327 A1 | 12/1987 | Germany . |
| 44 14 276 C1 | 8/1995 | Germany . |
| 26-6956 | 5/1950 | Italy ........................................ 267/141 |
| 517722 | 6/1957 | Italy ........................................ 267/293 |
| 47-45989 | 11/1972 | Japan ..................................... 267/153 |
| 425628 | 1/1992 | Japan .................................. 267/141.5 |
| 4272527 | 9/1992 | Japan .................................. 267/141.2 |
| 2071265 | 9/1981 | United Kingdom . |
| 2 141 078 | 12/1984 | United Kingdom . |

OTHER PUBLICATIONS

Patent Abstract of Japan vol. 014, No. 127 (M–0947), Mar. 09, 1990 Applicant: Kinugawa Rubber Ind Co Ltd; Publication No.: 01320331; Publication Date: Dec. 26, 1989.
Patent Abstract of Japan vol. 013, No. 036 (M–790), Jan. 26, 1989 Applicant: Kinugawa Rubber Ind Co Ltd; Publication No.: 63246524; Publication Date: Oct. 13, 1988.
Patent Abstract of Japan vol. 006, No. 124 (M–141), Jul. 9, 1982 Applicant: Toyota Motor Corp.; Publication No.: 57051036; Publication Date: Mar. 25, 1982.

*Primary Examiner*—Douglas C. Butler
*Attorney, Agent, or Firm*—David P. Dureska

[57] ABSTRACT

An air-ride beam-type axle suspension system for tractor-trailers and other heavy-duty wheeled vehicles having a brake chamber of an air brake assembly mounted on the beam, wherein the beam is tapered. Specifically, each beam of the axle suspension system tapers from a narrower width at its end that is pivotally attached to a frame rail of the trailer, to a wider width at its opposite end. The tapered beam provides easier mounting of the suspension system on existing trailer frame rails and incorporation of a reduced-size pivot bushing at the narrower end of the beam, and optimizes the weight of the axle suspension system.

20 Claims, 19 Drawing Sheets

REDUCED SIZE BUSHING FOR BEAM-TYPE AXLE SUSPENSION SYSTEM

This is a continuation-in-part of application Ser. No. 08/704,090 filed Aug. 28, 1996, now abandoned.

BACKGROUND OF THE INVENTION

1. Technical Field

The invention relates to axle suspension systems for wheeled vehicles, and in particular to beam-type axle suspension systems for wheeled vehicles. More particularly, the invention is directed to a beam-type axle suspension system for tractor-trailers in which each beam tapers from a narrower width at its end that is pivotally attached to the trailer frame without special mounting accessories and utilizing a reduced size bushing.

2. Background art

The use of air-ride beam-type axle suspension systems and air brakes has become very popular in the heavy-duty truck and tractor-trailer industry. Although such suspensions can be found in wide and varying structural forms, in general their structure is similar in that each system typically includes a pair of longitudinally extending beams. Each beam is located adjacent to and below a respective one of a pair of spaced-apart longitudinally extending frame rails which depend from the trailer. More specifically, each beam is pivotally connected at one of its ends to a hanger which is attached to and depends from a respective one of the frame rails. An axle extends transversely between and is mounted in openings formed in the beams generally adjacent to the end of the beam opposite from the pivotal connection end. The opposite end of each beam also is connected to a bellows air spring or its equivalent which in turn is connected to a respective one of the trailer rails. A brake assembly and shock absorber typically also are mounted on each of the beams. The beam may extend rearwardly or frontwardly relative to the front end of the tractor-trailer, thus defining a trailing arm or leading arm beam suspension system, respectively.

Also, it is well-known that air-ride beam-type axle suspension systems generally require a substantial bushing at the pivotal attachment point of each beam to the trailer frame rails for satisfactory reaction to static loads, roll moments and braking forces. This bushing requirement results in a wide hanger bracket depending from each of the trailer frame rails, which requires shims and other accessories for proper anchoring to the frame rails. This additional mounting equipment is a penalty when compared to prior art narrow leaf spring designs which generally fit within the confines of the trailer frame rails and therefore can be mounted thereto without additional assemblies.

Moreover, the weight of beam-type air suspension systems generally is greater than leaf spring suspension systems.

The present invention solves the problem of complicated mounting of the beams to the trailer rails and overall excessive weight of the system. These problems have been solved in the present invention by attachment of the pivotal end of the beam to a frame bracket which fits within the confines of a conventional trailer frame rail and is relatively easily anchored thereto, which in turn also enables use of a smaller pivot bushing. Moreover, the present invention optimizes the weight of the beam by removing material in its lower stress portions adjacent to the pivotal attachment end.

SUMMARY OF THE INVENTION

An objective of the present invention is to provide an air-ride beam-type axle suspension system for tractor-trailers which can be mounted on the trailer frame rails without special mounting accessories, and which includes a reduced size pivot bushing that exhibits satisfactory durability and reaction to static loads, roll moments, lateral forces, and braking forces.

A further objective of the present invention is to provide such an axle suspension system for tractor-trailers which has an optimal weight.

These objectives and advantages are obtained by a bushing for a vehicle suspension, the bushing includes an elastic, generally cylindrical-shaped body having a pair of spaced-apart generally concave sides and being formed with a central opening which passes completely through the body and each of the sides about a horizontal pivotal axis of the body, the body having an edge formed at an interface of each of the sides with a peripheral end of the body, and the edge generally being free of a radius, a mounting tube in which the elastic body is mountable, whereby the concave sides generally flatten enabling the elastic body to substantially fill the tube, a rigid sleeve immovably mounted in the central opening, the rigid sleeve outside diameter being generally equal to the central opening diameter, the sleeve extending substantially the entire width of the central opening to facilitate mounting of the bushing on a vehicle suspension, and a pair of spaced apart voids formed in each of the elastic body sides, the pair of voids being formed in each of the sides above and below the central opening, and an imaginary vertical center of each of the voids being disposed about 90 degrees from an imaginary horizontal plane passing transversely through the body when the bushing is mounted on a vehicle suspension, the voids each being generally horizontal rectangular-shaped, the elastic body being generally solid apart from the voids and the central opening, so that the bushing is more rigid in the direction of the horizontal plane than in the direction of the vertical center when the vehicle suspension is subjected to horizontal and vertical loads, respectively.

BRIEF DESCRIPTION OF THE DRAWINGS

The preferred embodiments of the invention, illustrative of the best mode in which applicants have contemplated applying the principles, is set forth in the following description and is shown in the drawings and is particularly and distinctly pointed out and set forth in the appended claims.

3

Figure 5:
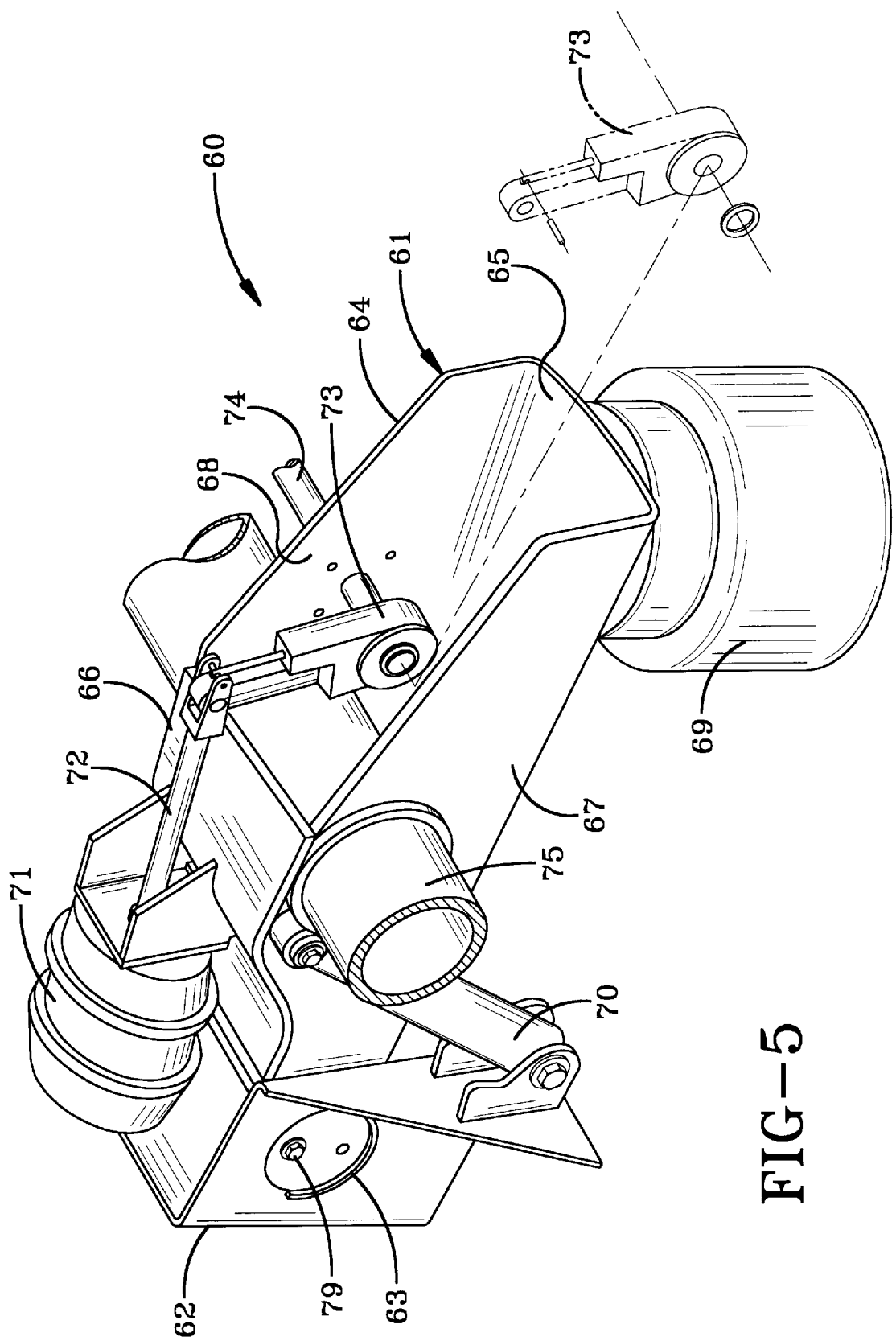
FIG. 5 is a fragmentary inverted perspective view of an air-ride tapered beam-type axle suspension system for a tractor-trailer which incorporates the reduced size bushing of the present invention, showing the manner of removal of the brake assembly slack adjuster in phantom lines and exploded format.
Figure 6:
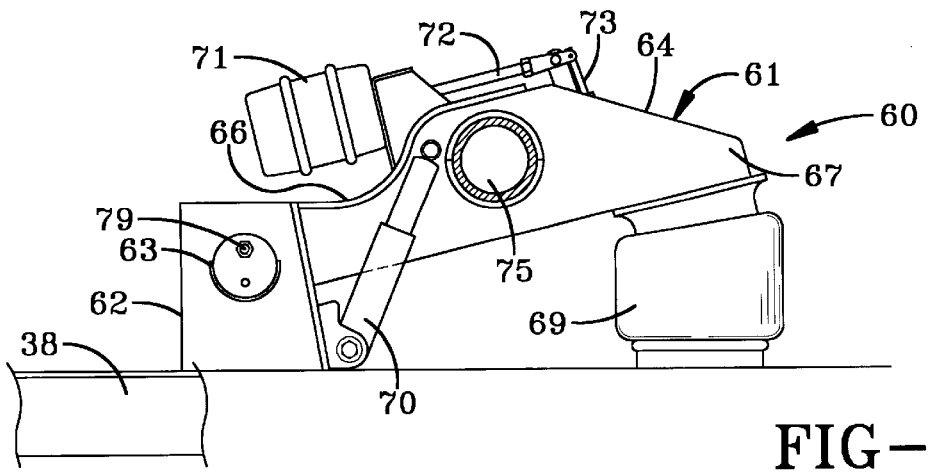
Figure 7:
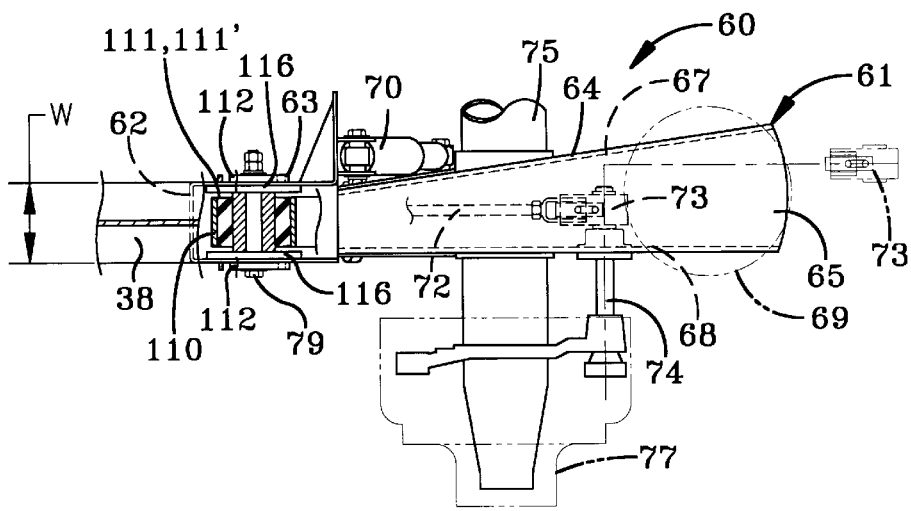
Figure 8:
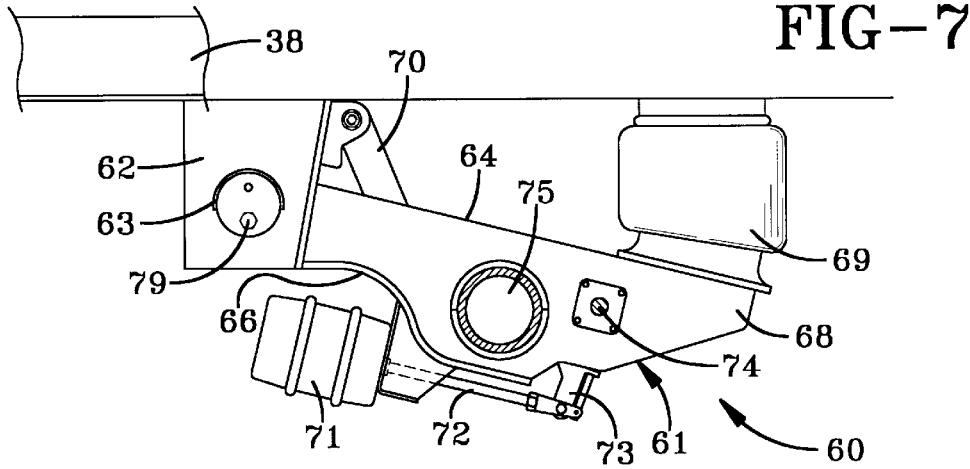
Figure 9:
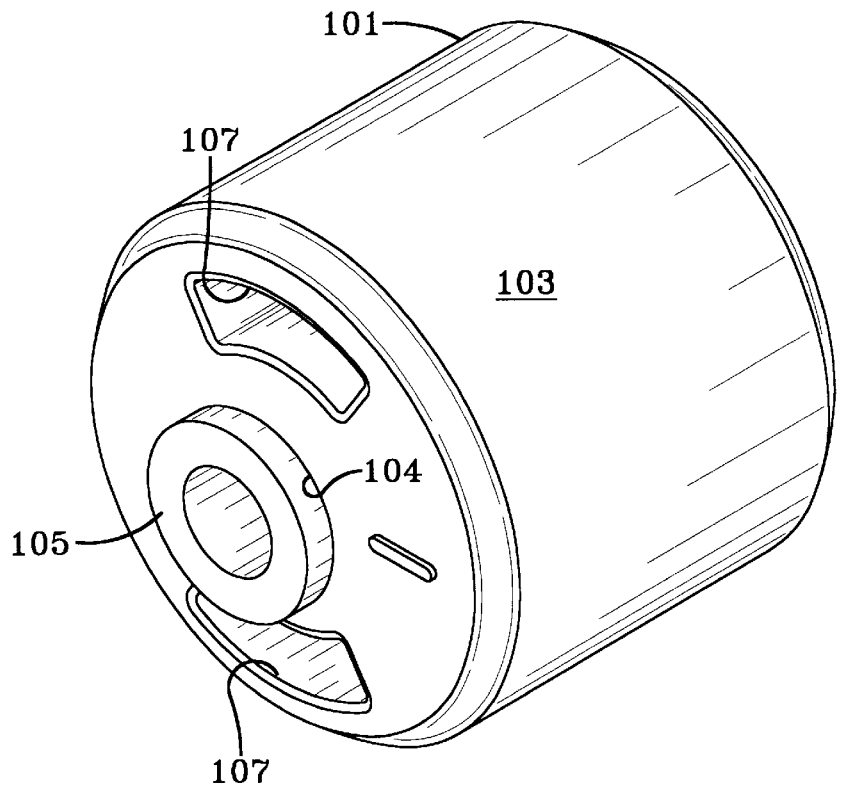
Figure 10:
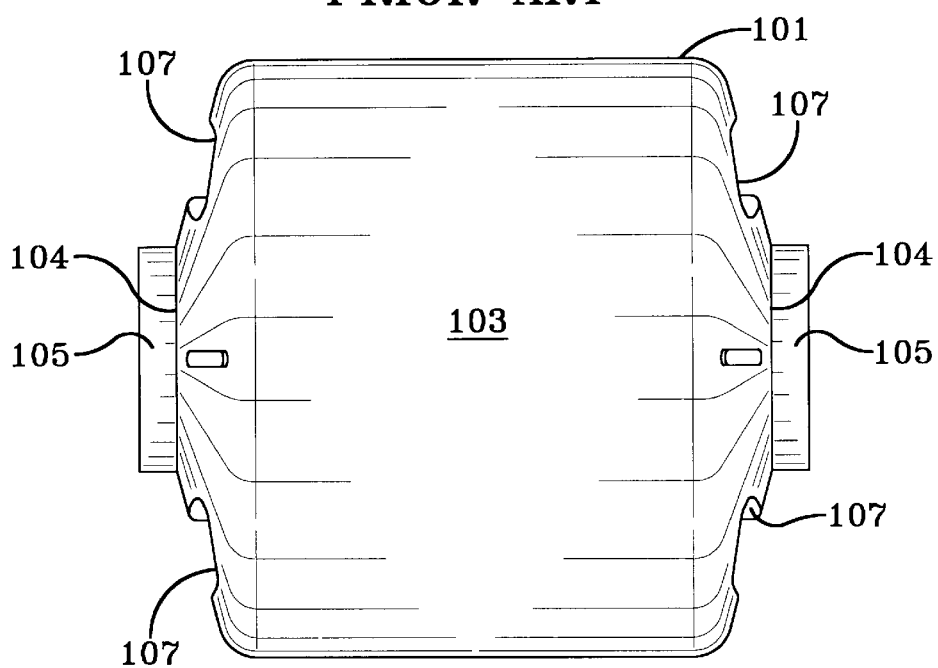
Figure 11:
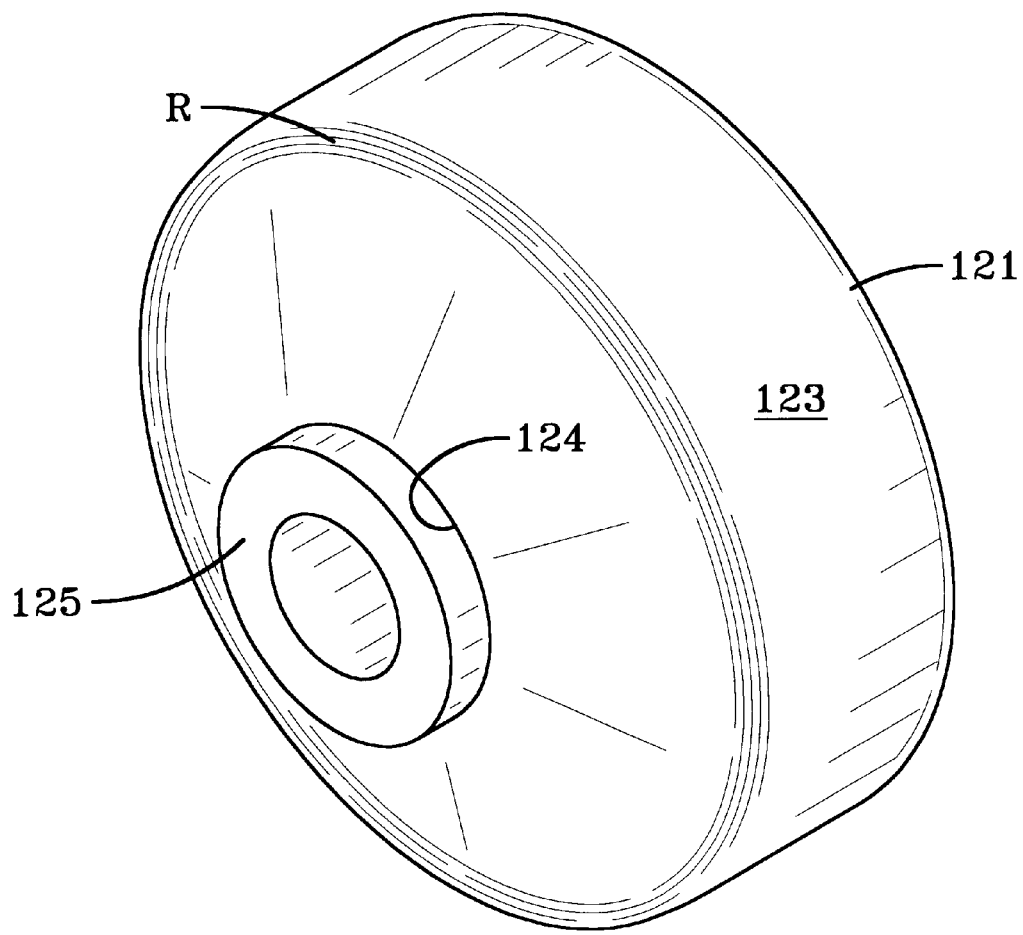
Figure 12:
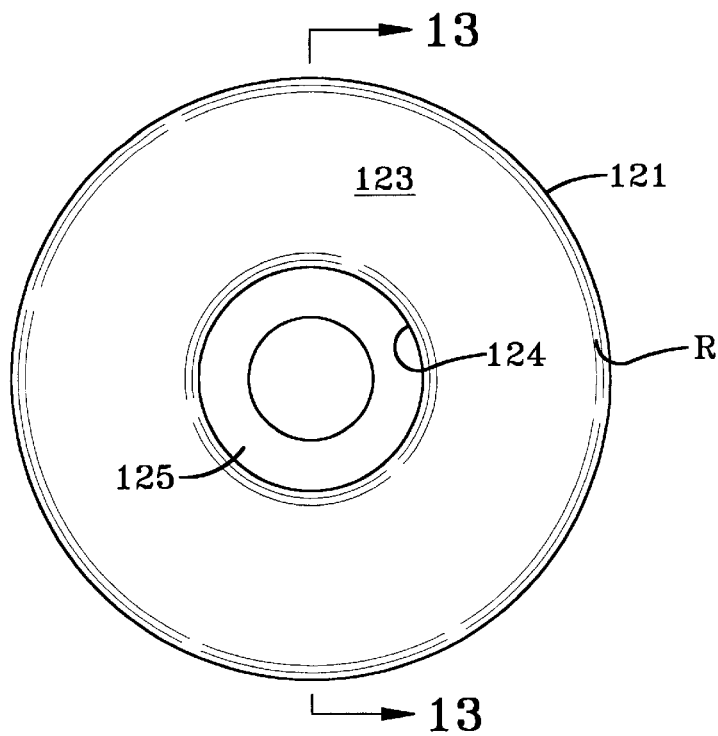
Figure 13:
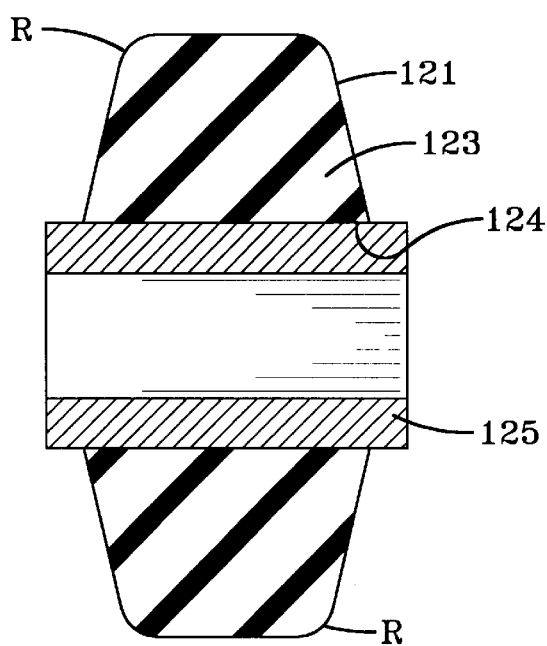
Figure 14:
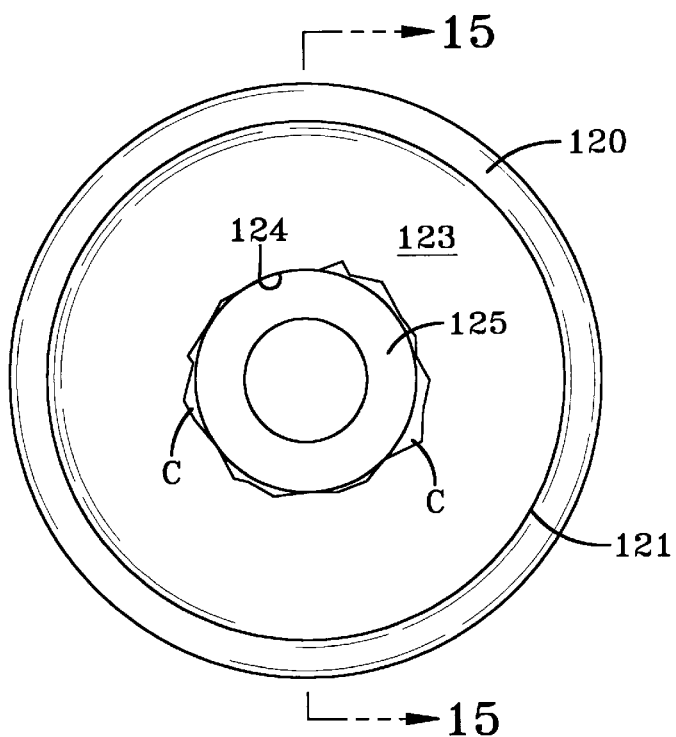
Figure 15:
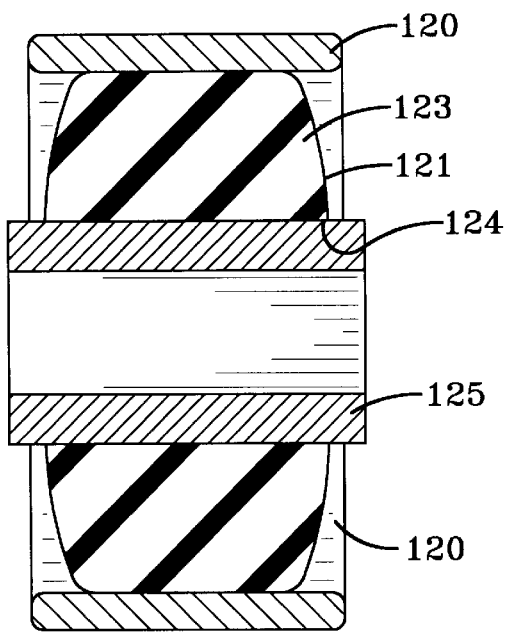
Figure 16:
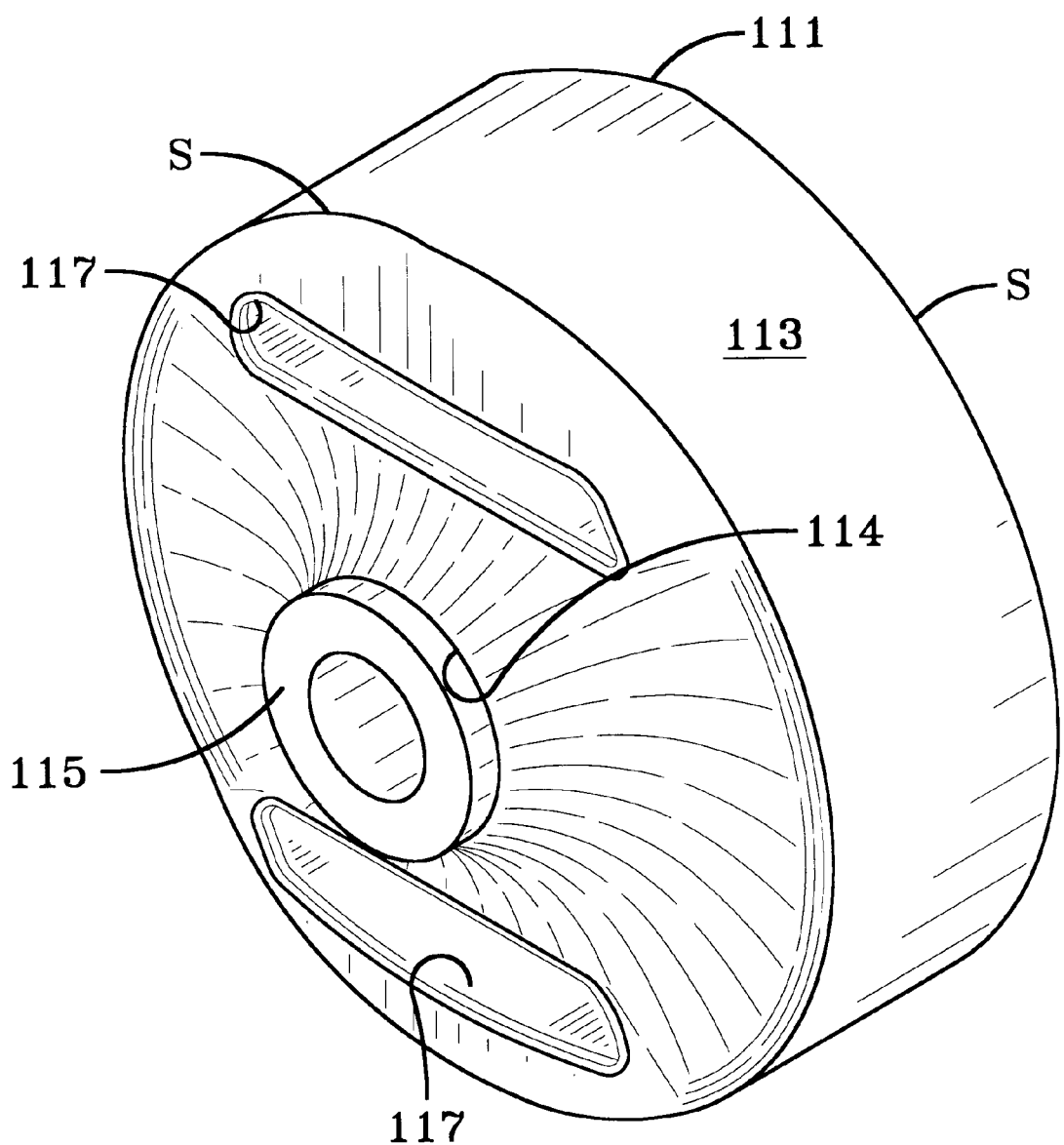
Figure 17:
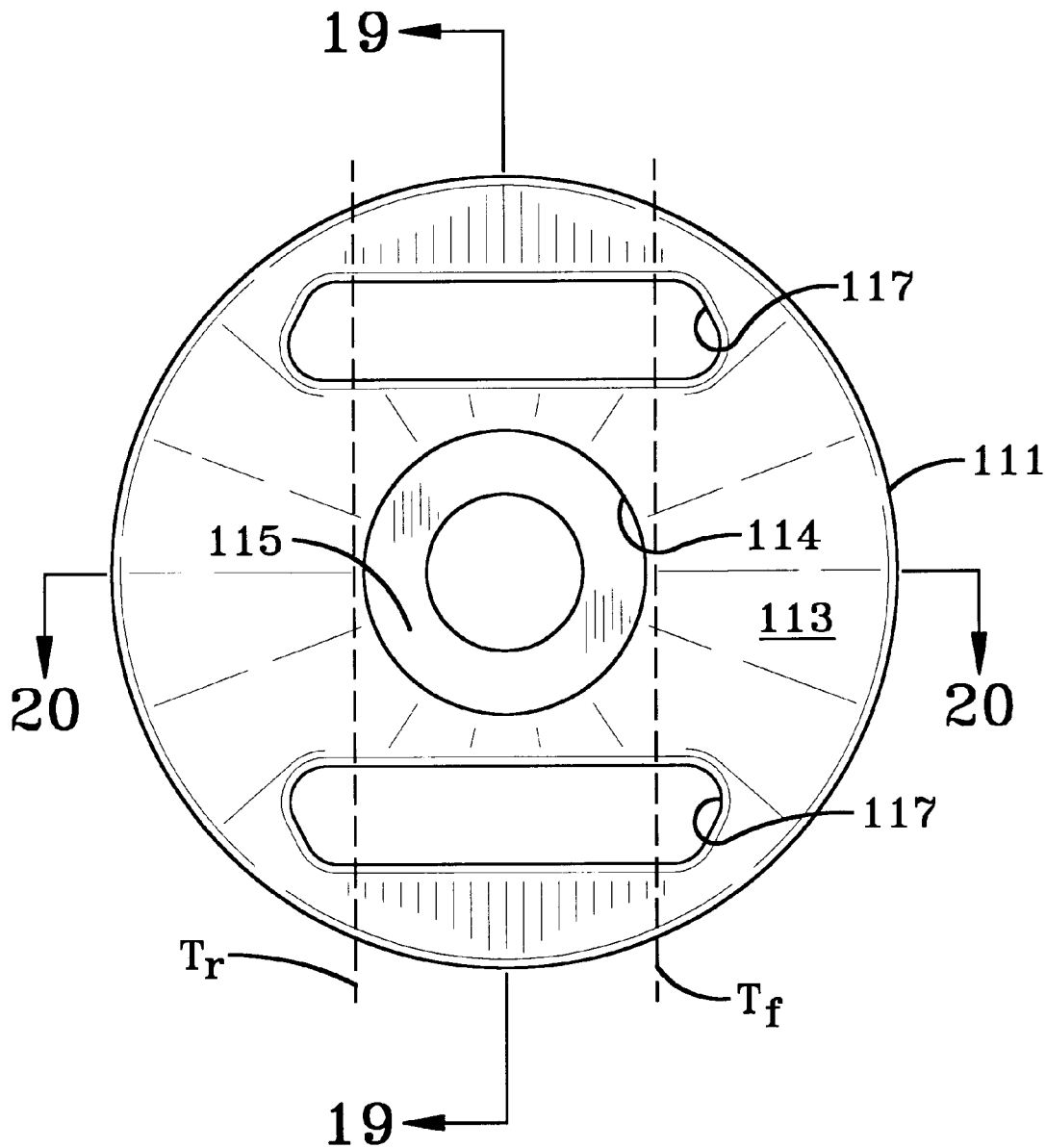
Figure 18:
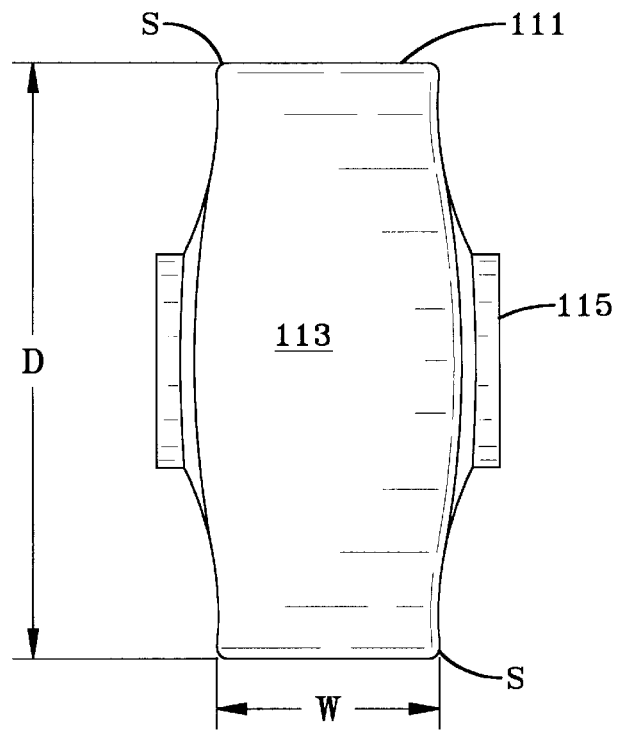
Figure 18A:
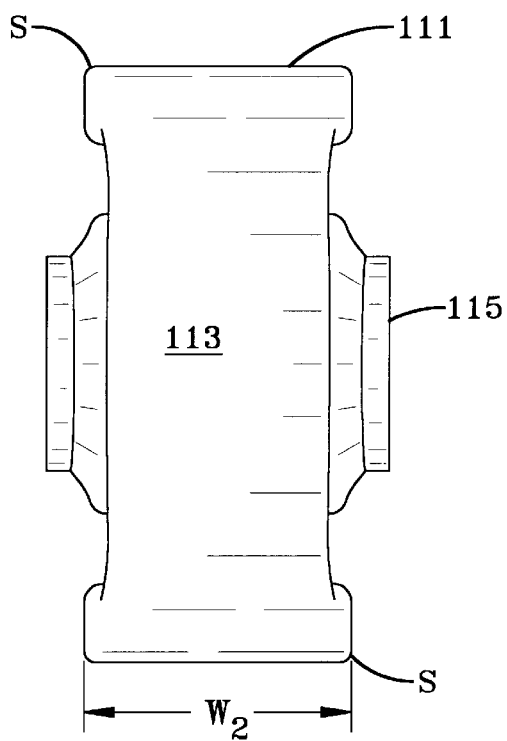
Figure 19:
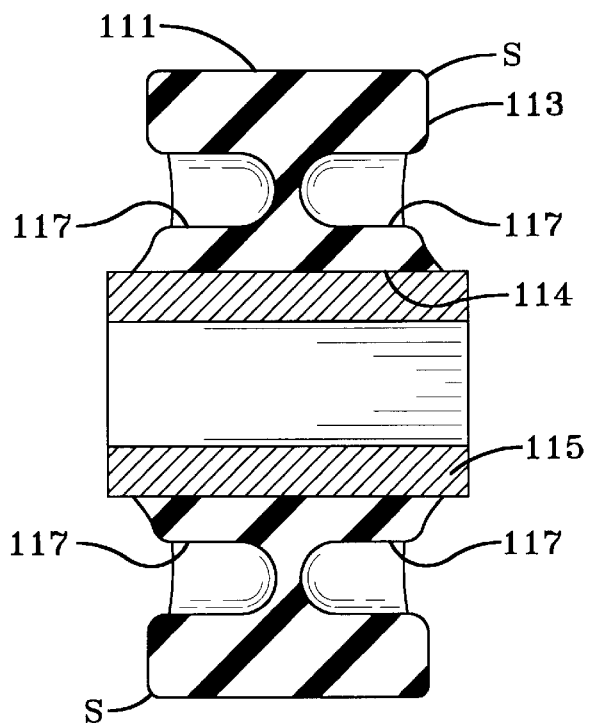
Figure 20:
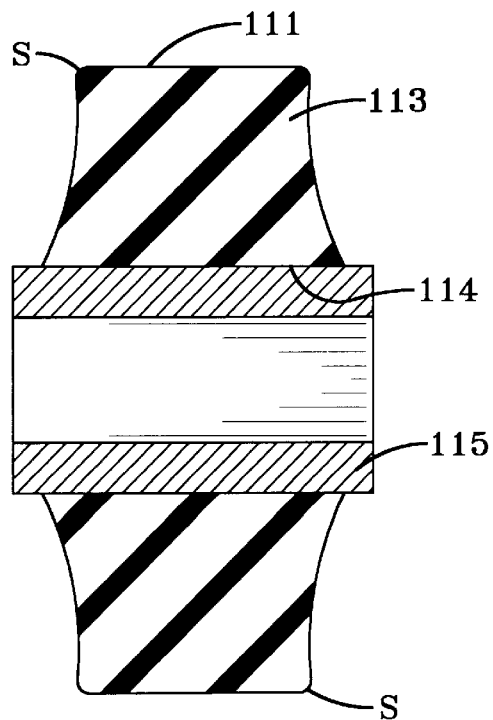
Figure 21:
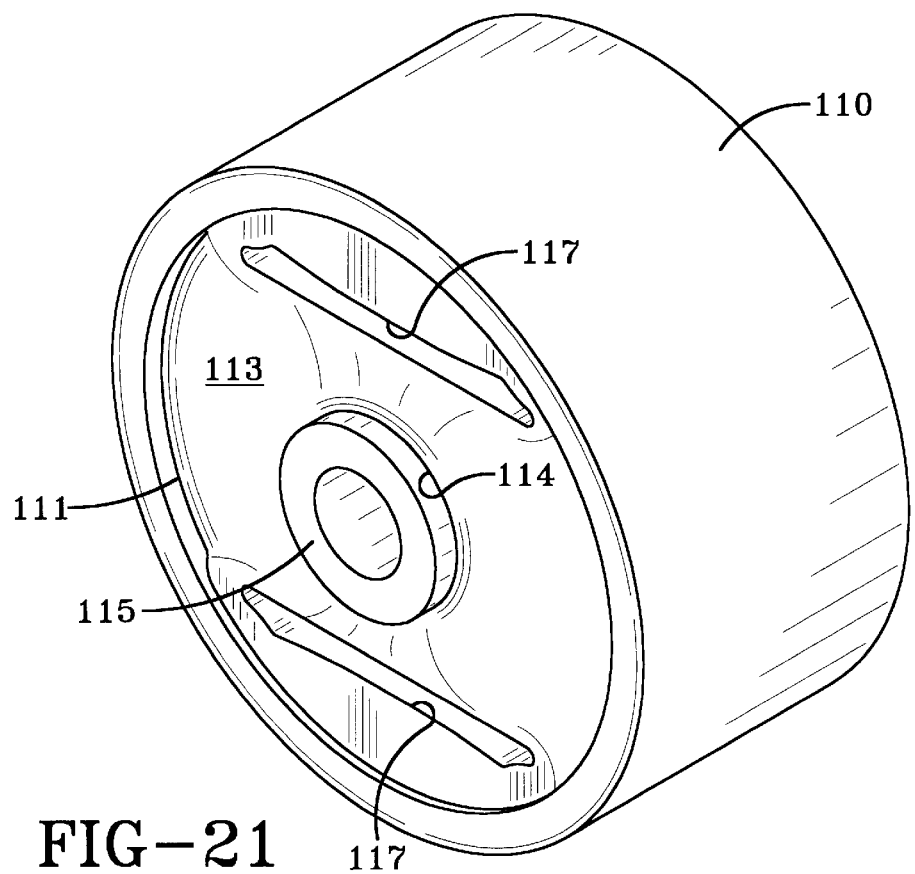
Figure 22:
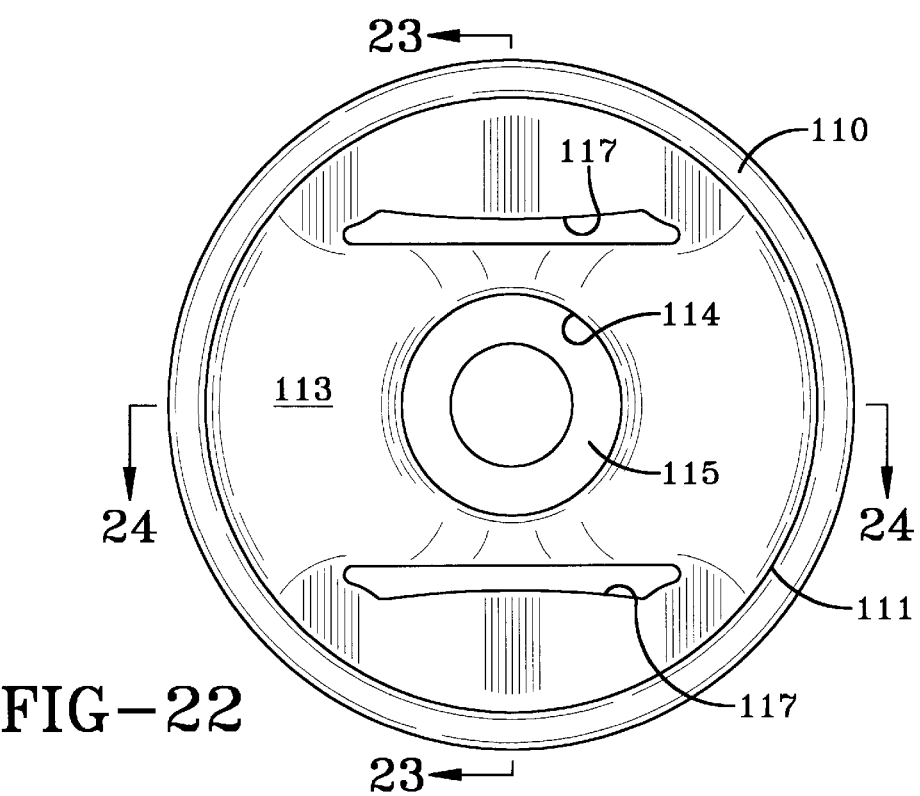
Figure 23:
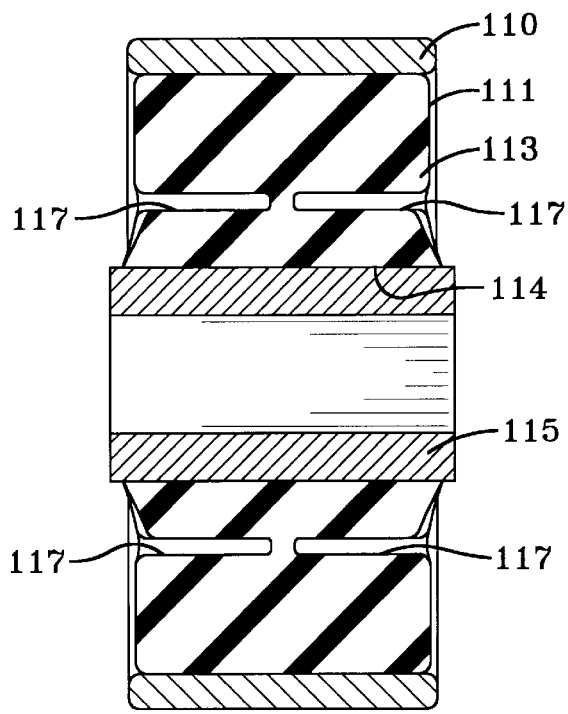
Figure 24:
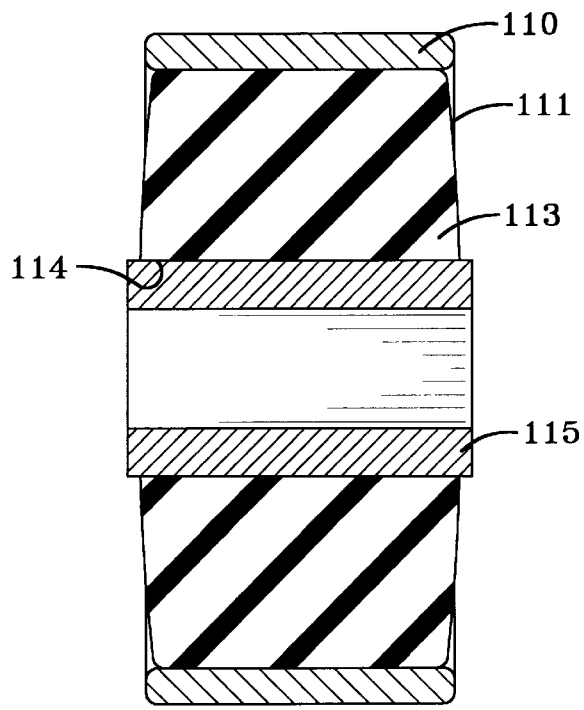
Figure 25:
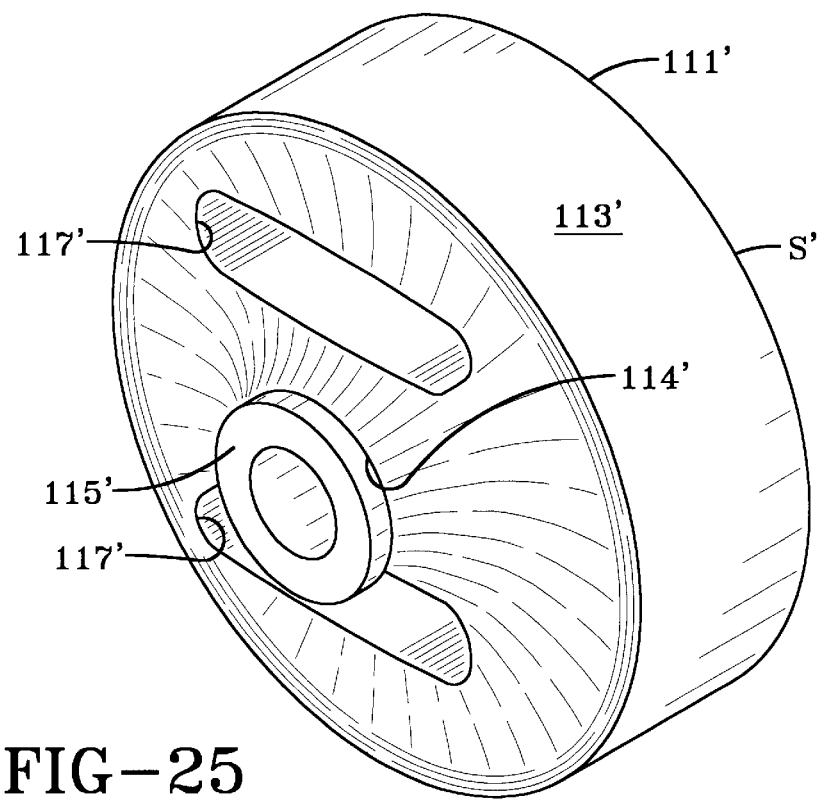
Figure 26:
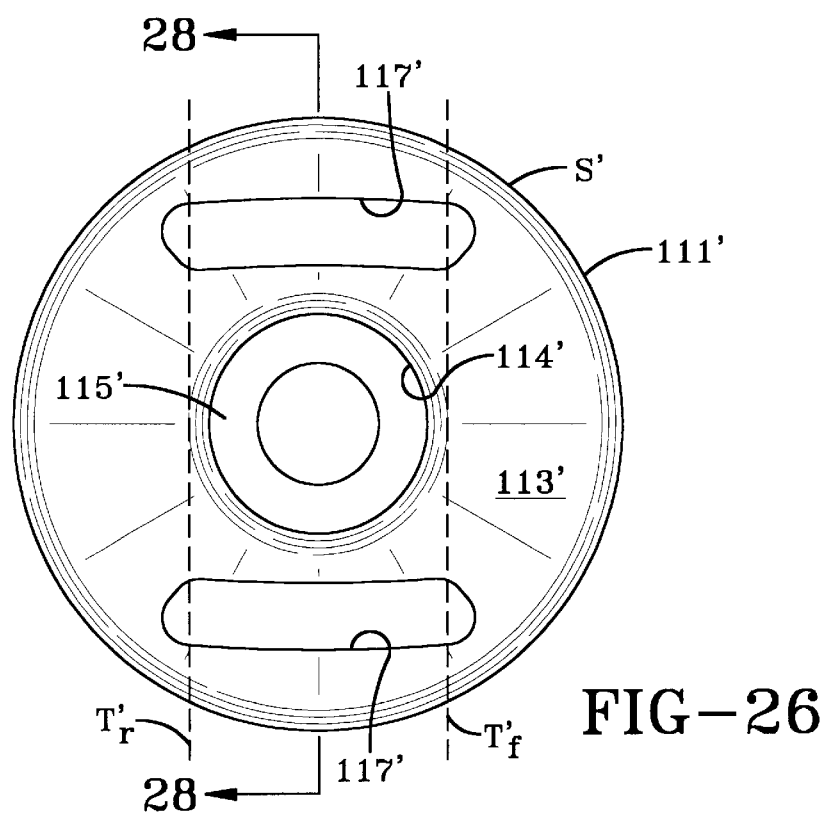
Figure 27:
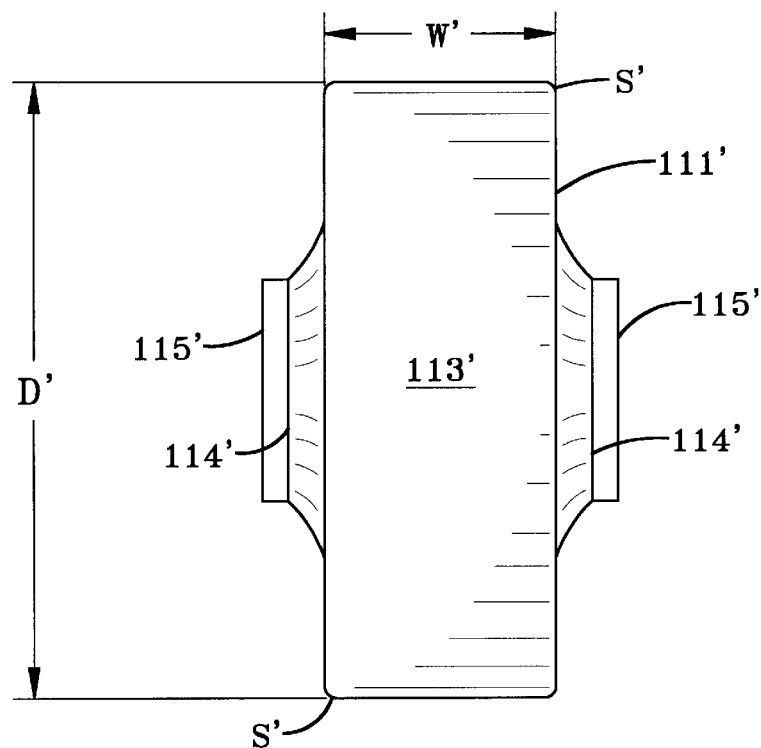
Figure 28:
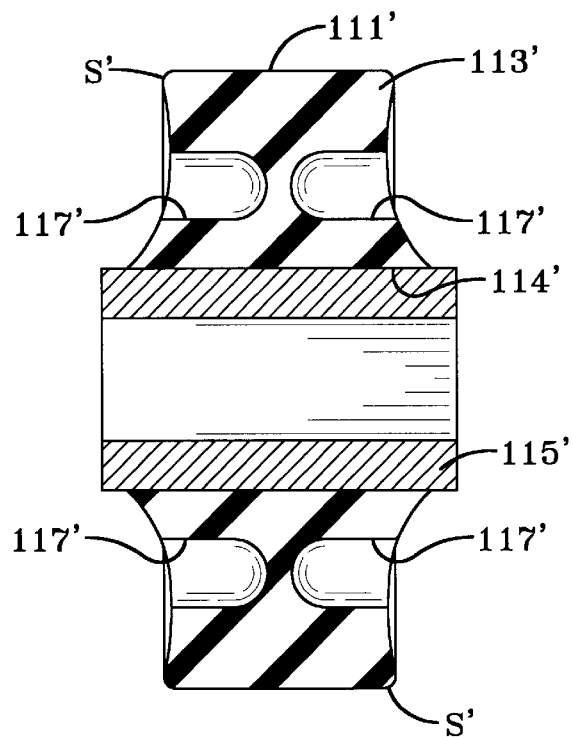

FIG. 6 is a reduced inboard elevational view of the suspension system shown in FIG. 5, with portions thereof shown in section and phantom lines;

FIG. 7 is a fragmentary upright top plan view of the suspension system of FIG. 6 attached to a trailer frame rail, with portions thereof broken away and shown in section and phantom lines, and showing the manner of removal of the brake assembly slack adjuster in exploded format;

FIG. 8 is an upright outboard elevational view of the suspension system of FIGS. 5–7, with portions thereof shown in section and phantom lines;

FIG. 9 is a perspective view of a prior art conventional-size voided pivot bushing;

FIG. 10 represents a front and rear end view, wherein the views are identical, of the prior art voided bushing of FIG. 9;

FIG. 11 is a perspective view of a prior art reduced-size solid pivot bushing;

FIG. 12 is a side view of the prior art solid bushing of FIG. 11;

FIG. 13 is a sectional view taken along line 13—13 of FIG. 12;

FIG. 14 is a side view showing the prior art solid bushing of FIGS. 11–13 press fitted into a mounting tube of a beam-type axle suspension system, and further showing a common area of crack initiation or rubber deterioration caused in the bushing after it is subjected to loading conditions;

FIG. 15 is a sectional view taken along lines 15—15 of FIG. 14, without depicting the crack initiation shown in FIG. 14;

FIG. 16 is a perspective view of a first embodiment of the reduced-size voided pivot bushing of the present invention;

FIG. 17 is a side view of the reduced-size voided bushing of FIG. 16;

FIG. 18 represents a top and bottom end view, wherein the views are identical, of the reduced-size voided bushing of FIGS. 16 and 17;

FIG. 18A represents a front and rear end view, wherein the views are identical, of the reduced-size voided bushing of FIGS. 16–18;

FIG. 19 is a sectional view taken along line 19—19 of FIG. 17;

FIG. 20 is a sectional view taken along line 20—20 of FIG. 17;

FIG. 21 is a perspective view showing the reduced-size voided bushing of FIGS. 16–20 press-fitted into a mounting tube of a beam-type axle suspension system and further showing the compressed state of the bushing;

FIG. 22 is a side view of the bushing of FIG. 21;

FIG. 23 is a sectional view taken along line 23—23 of FIG. 22;

FIG. 24 is a sectional view taken along line 24—24 of FIG. 22;

FIG. 25 is a perspective view of a second embodiment of the reduced-size voided pivot bushing of the present invention;

FIG. 26 is a side view of the reduced-size voided bushing of FIG. 25;

FIG. 27 is an end view of the reduced-size voided bushing of FIGS. 25 and 26;

FIG. 28 is a sectional view taken along line 28—28 of FIG. 26;

4

Figure 29:
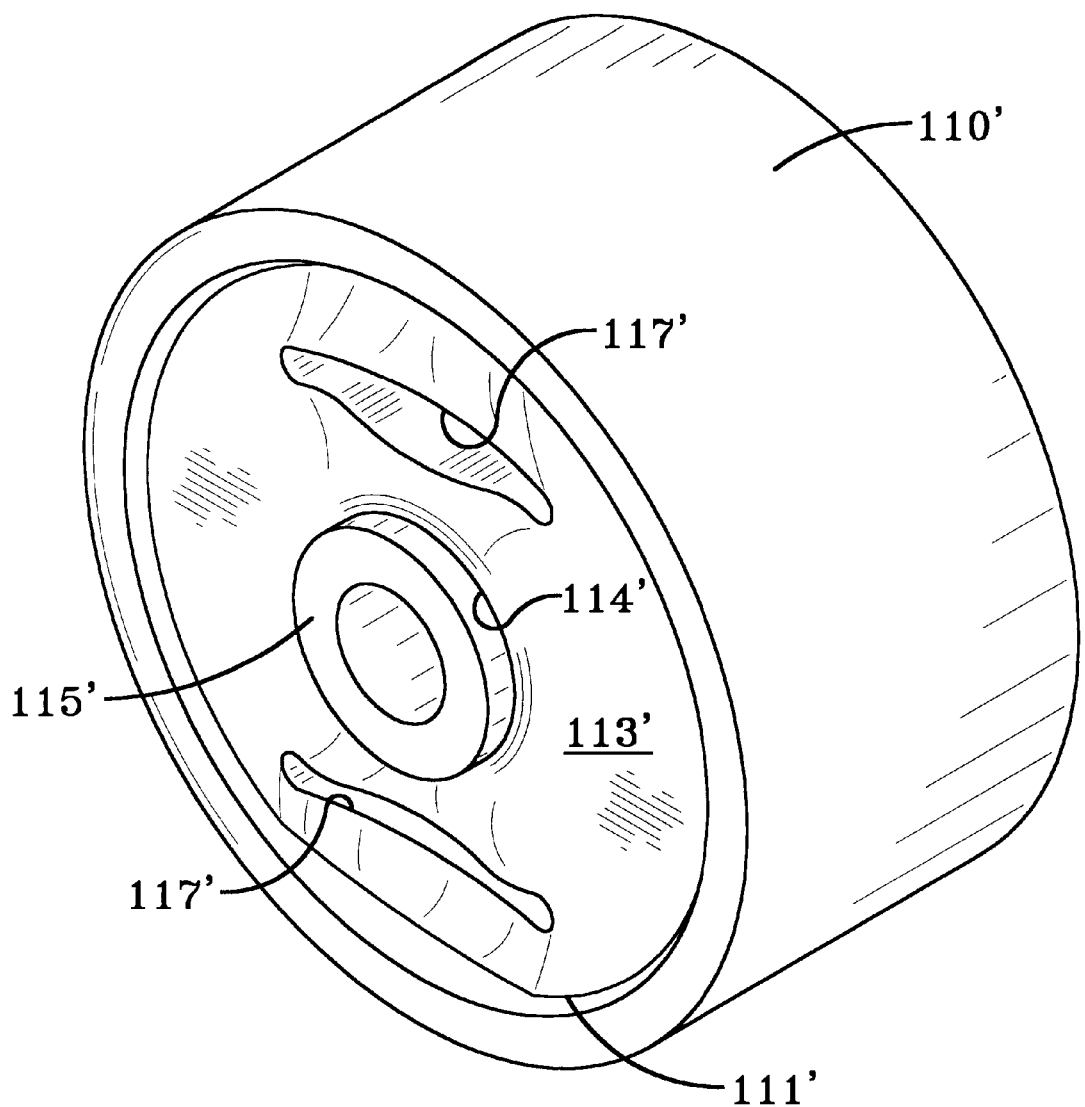
Figure 30:
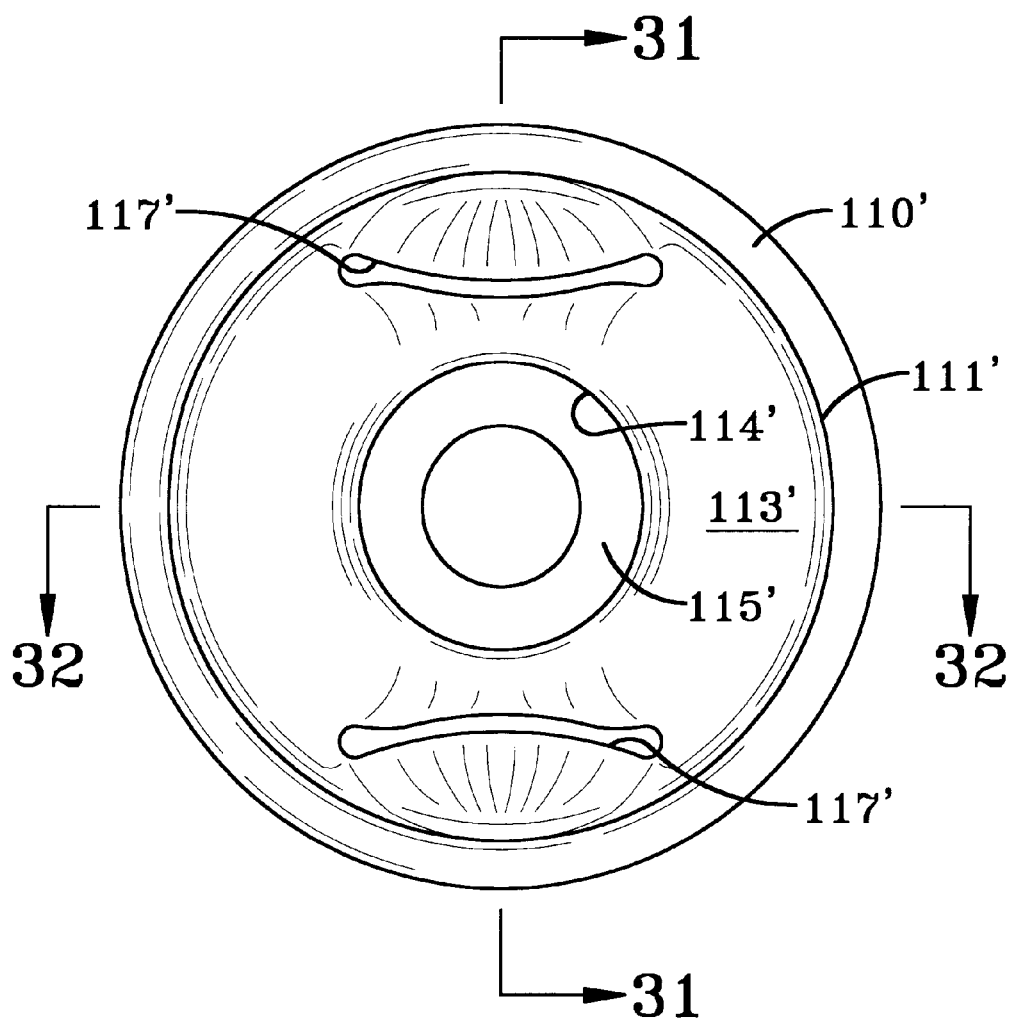
Figure 31:
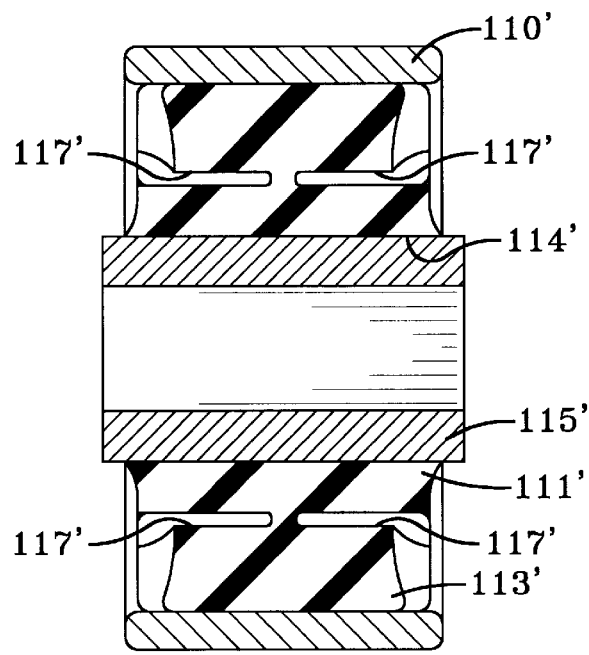

FIG. 29 is a perspective view showing the reduced-size voided bushing of FIGS. 25–28 press-fitted into a mounting tube of a beam-type axle suspension system and further showing the compressed state of the bushing;

FIG. 30 is a side view of the bushing assembly of FIG. 29;

FIG. 31 is a sectional view taken along line 31—31 of FIG. 30; and

Figure 32:
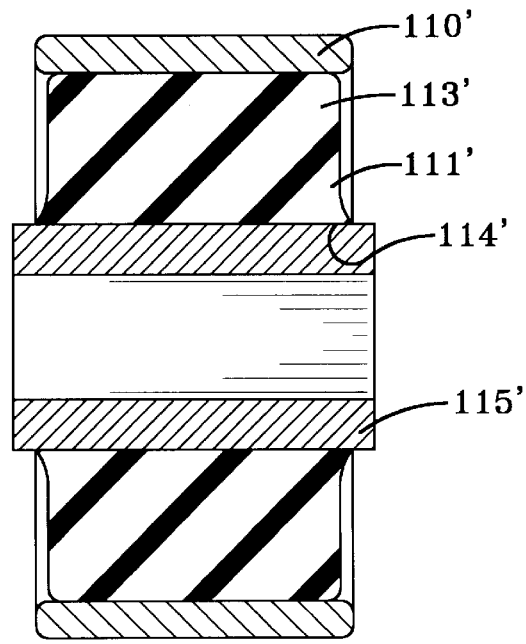

FIG. 32 is a sectional view taken along line 32—32 of FIG. 30.

Similar numerals refer to similar parts throughout the drawings.

DESCRIPTION OF THE PREFERRED EMBODIMENTS

Figure 1:
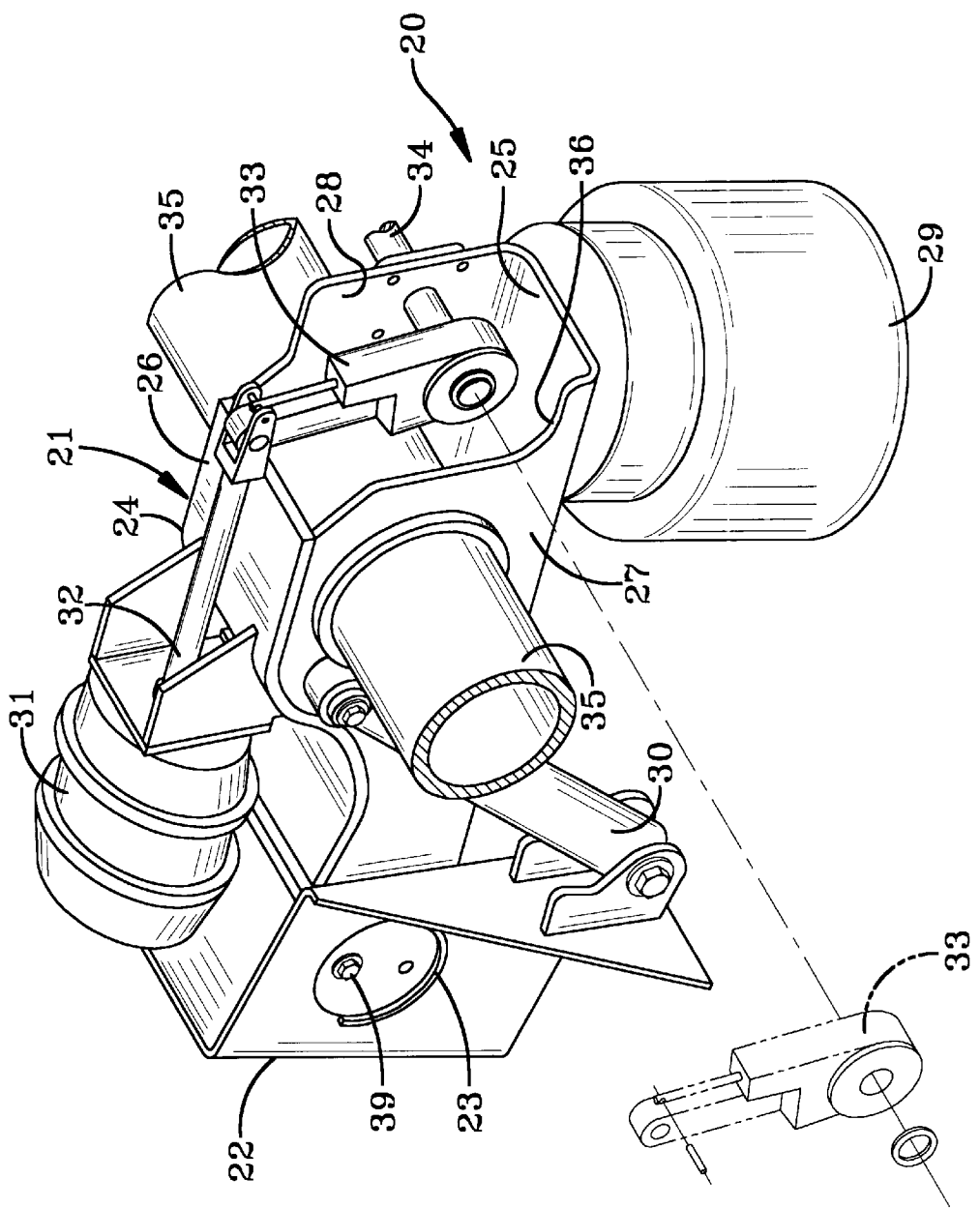
FIG. 1 is a fragmentary inverted perspective view of a prior art air-ride beam-type axle suspension system for a tractor-trailer, showing the manner of removal of the brake assembly slack adjuster in phantom lines and exploded format.

A prior art air-ride beam-type trailing arm axle suspension system for a tractor-trailer is indicated generally at 20 and is shown in FIG. 1. Inasmuch as axle suspension system 20 includes generally identical suspension assemblies 21 each suspended from a respective one of a pair of hangers 22, only one of the suspension assemblies will be described in detail herein, and shown in FIGS. 1–4. Hanger 22 is, by any suitable means, securely mounted on and depends from a respective one of a pair of spaced-apart, parallel longitudinally extending elongated frame rails 38 which are secured to and depend from the underside of the trailer of a semi-trailer (FIG. 3).

A bushing assembly 23 is rigidly attached to the front end of a trailing arm or beam 24 by any suitable means such as welding. More specifically, and as best shown in FIG. 3, bushing assembly 23 includes a beam mounting tube 100 which is welded to the front end of beam 24. A prior art conventional-size voided pivot bushing 101 is press-fitted into tube 100 in a manner well known to the art and to the literature. Each one of a pair of alignment collars 102 is rigidly mounted in a respective slot (not shown) formed in each sidewall of hanger 22 to properly align tube 100 relative to the hanger. Prior art voided bushing 101 of the type heretofore utilized in beam-type trailing arm axle suspension systems 20 and other suspension applications for trucks and tractor-trailers and the like, is best shown in FIGS. 9 and 10. Prior art bushing 101 includes an elastic, generally cylindrical-shaped body 103 formed with a central opening 104 which passes completely through the body about its longitudinal axis. A rigid metal sleeve 105 is friction fitted in opening 104 of body 103 and is bonded to the body at the peripheral surface of the sleeve by any suitable adhesive. Sleeve 105 extends slightly outwardly from both ends of opening 104 to provide means for pivotally attaching bushing 101 to suspension hanger 22 by passing a bolt 39 through metal sleeve 105 and a pair of wear pads 106 formed of any suitable plastic, each one of the pair being loosely disposed over a respective one of the ends of the metal sleeve (FIG. 3). Wear pads 106 protect the ends of beam mounting tube 100, each one of the ends of which abuts a respective one of the sidewalls of hanger 22. Elastic body 103, when used in tractor-trailer suspensions having a GAWR of from about 18,000 lbs. to about 25,000 lbs., preferably is formed of natural rubber having a durometer of from about 50 to about 75. Metal sleeve 105 can be made of any suitable hard metal such as steel. A pair of spaced-apart voids 107 is formed in each side of elastic body 103 of bushing 101. More specifically, a generally radially inwardly curving, rectangular-shaped void 107 is formed in each of the top and bottom portions of each side of body 103. Voids 107 enable prior art bushing 101 to achieve multifunctional characteristics. More specifically, the multifunctional characteristics include required load and deflection ratios, or static rates, of varying levels in different directions for semi-trailer axle suspension system applications. The bushing static rate is stiff in the horizontal radial direction, so that axle suspension system 20 remains substantially perpendicular to the direction of movement of the tractor-trailer despite horizontal loading which may be placed on the suspension system, and relatively soft in the vertical radial direction, to enable the suspension system and bushing 101 to absorb vertical loading shocks and provide a smooth ride for the vehicle occupants and any cargo carried by the vehicle.

Figure 2:
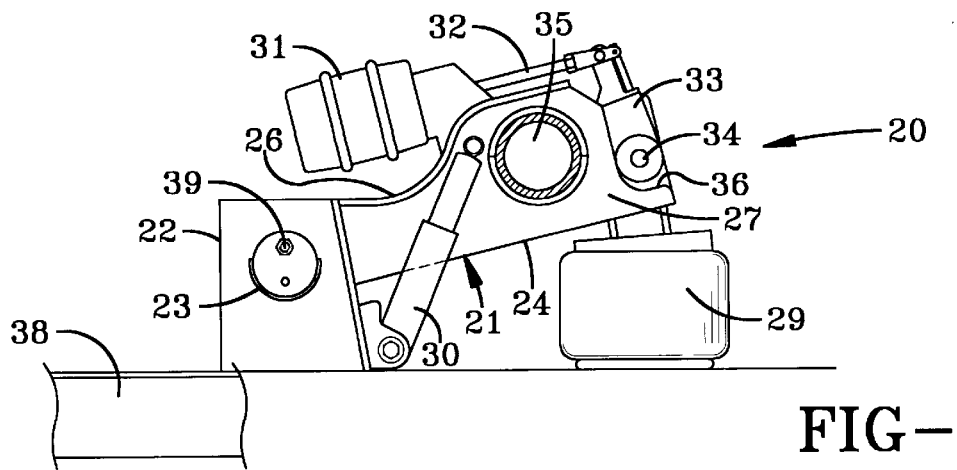
FIG. 2 is a reduced inboard elevational view of the prior art suspension system shown in FIG. 1, with portions thereof shown in section and phantom lines.
Figure 3:
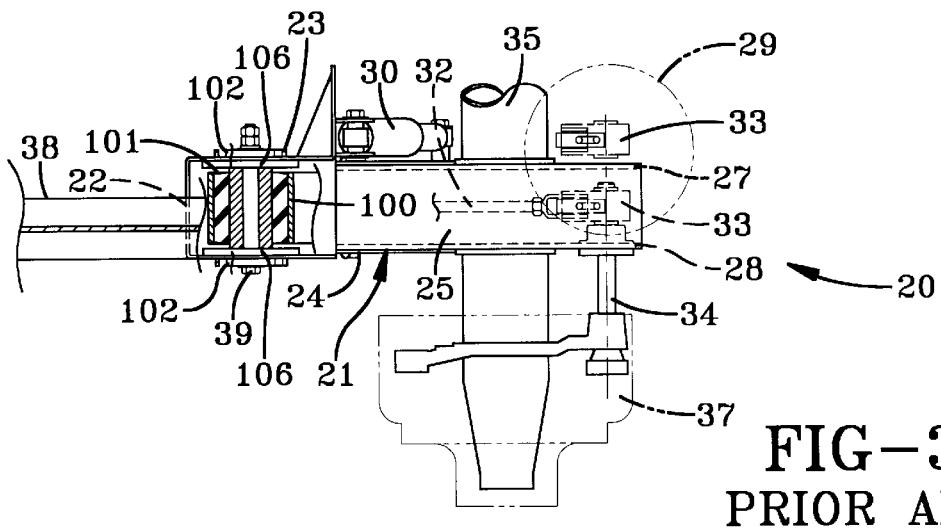
FIG. 3 is a fragmentary upright top plan view of the prior art suspension system of FIG. 2 attached to a trailer frame rail, with portions thereof broken away and shown in section and phantom lines, and showing the manner of removal of the brake assembly slack adjuster in exploded format.
Figure 4:
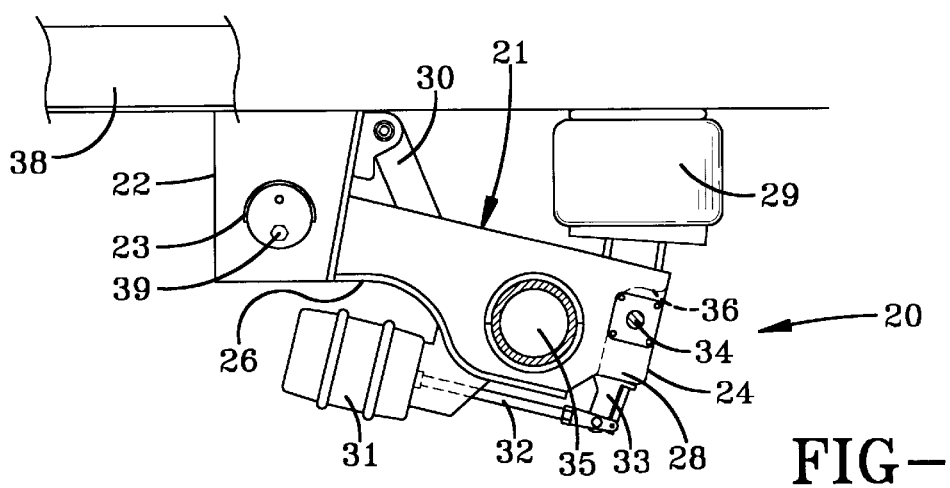
FIG. 4 is an upright outboard elevational view of the prior art suspension system of FIGS. 1–3, with portions thereof shown in section and phantom lines.

Keeping in mind that FIGS. 1 and 2 are inverted views, beam 24 generally is rectangular-shaped and includes spaced-apart top and bottom walls 25 and 26, respectively, and spaced-apart parallel inboard and outboard sidewalls 27 and 28, respectively. Top wall 25 is formed integrally with sidewalls 27, 28, and bottom wall 26 extends between, is welded to, and interconnects the sidewalls. An air spring 29 is suitably mounted on and extends between the upper surface of the rear end of top wall 25 and frame rail 38. A shock absorber 30 extends between and is mounted on inboard sidewall 27 of suspension beam 24 and hanger 22. An air brake chamber 31 of the semi-trailer braking system (only portions shown) is mounted on bottom wall 26 of suspension beam 24 by any suitable means such as welding. A piston 32 of brake chamber 31 in turn is pivotally attached to a slack adjuster 33, which in turn is immovably mounted on a cam shaft 34 of the braking system to provide for transfer of in-line loads from the brake chamber piston into a torsional load on the cam shaft. An axle 35 extends between and is immovably captured in suspension beam 24 and its corresponding opposite suspension beam of axle suspension system 20.

The location of brake chamber 31 on bottom wall 26 of beam 24 necessitates disposition of slack adjuster 33 between sidewalls 27, 28 of the beam. To enable servicing/removal/replacement of slack adjuster 33, inboard sidewall 27 is provided with a cutout 36 to enable the slack adjuster to be accessed and/or removed from cam shaft 34.

Despite its use on tractor-trailers, the above-described prior art suspension system 20 has potential shortcomings. First, cutout 36 causes a potential weak spot in the structure of beam 24, which could weaken the suspension assembly 21 and/or suspension system 20 in certain situations such as when the beam is subjected to increased load capacity. Although beam 24 can be reinforced to counteract the potential weak spot, reinforcement would add unwanted weight and cost to suspension system 20.

Air-ride beam-type axle suspension systems 20 as described hereinabove, in general utilize a large bushing 101 (FIGS. 9 and 10) which corresponds to the size/width of beam 24 and reacts to static loads, roll moments and braking forces encountered by the suspension system during normal operation. Thus, a wide hanger 22 is required to accommodate bushing 23 and typically is wider than the typical width of original equipment trailer frame rails 38, as best shown in FIG. 3. This size discrepancy requires shims and other accessory structures (not shown) to properly anchor hanger 22 to its respective frame rail 38. This is a penalty when compared to narrow leaf spring suspension system designs which generally fit within the typical trailer frame rail confines.

Moreover, leaf spring axle suspension systems generally are lighter in weight than air-ride beam-type axle suspension systems such as described at 20 above and shown in FIGS. 1–4.

Furthermore, axle suspension system 20 must overcome less efficient axle support centers than a typical leaf spring axle suspension system, because large air spring 29 must be offset inboard to avoid hitting a tire (not shown) of trailer wheel 37, as best shown in FIG. 3. Trailing arm beam 24 must in turn be disposed further inboard to support air spring 29, thus moving the seat centers of axle 35 inboard with a resultant loss in axle support efficiency.

An air-ride beam-type trailing arm axle suspension system for a tractor-trailer incorporating the present invention is indicated generally at 60 and is shown in FIG. 5. Inasmuch as axle suspension system 60 includes generally identical suspension assemblies 61 each suspended from a respective one of a pair of hangers 62, only one of the suspension assemblies will be described in detail herein and shown in FIGS. 5–8. All components of system 60 are formed of a suitable strong metal or other sturdy material, unless otherwise noted. Hanger 62 is, by any suitable means, securely mounted on and depends from a respective one of the pair of spaced-apart, parallel longitudinally extending elongated frame rails 38 which are secured to and depend from the underside of the trailer of a tractor-trailer.

As best shown in FIG. 7, the width of hanger 62, identified as W, is less than the width of prior art suspension assembly hangers such as those identified at 22 in FIGS. 1–4 hereinabove. The reason for this decreased width W of hanger 62 will be described in detail hereinbelow. However, the decreased width of hanger 62 results in two practical advantages which require immediate description. First, reduced width hanger 62 closely matches the width of trailer frame rails 38, thus enabling hanger 62 to be directly mounted on its respective frame rail 38 without requiring shims or other special accessory parts as is required for many prior art hangers which are wider than the frame rail. Second, a pivot bushing assembly 63 for pivotal mounting in hanger 62 and rigid attachment to the front end of a trailing arm or beam 64 by any suitable means such as welding, can be of reduced size/width, which assists in reducing the overall weight of suspension assembly 61.

Bushing assembly 63 (FIG. 7) includes a beam mounting tube 110 which is welded to the front end of beam 64. In accordance with a key feature of the present invention, a reduced-size voided pivot bushing 111, 111' is press-fitted into tube 110. The basic structure of a first embodiment reduced-size bushing 111 of the present invention, as well as a second embodiment reduced-size bushing 111' of the present invention, is described briefly immediately below, with a more detailed description of the structure and the key features of the first and second embodiment bushings appearing thereafter hereinbelow. Each one of a pair of alignment collars 112 is rigidly mounted in a respective slot (not shown) formed in each sidewall of hanger 62 to properly align tube 110 relative to the hanger. As best shown in FIGS. 16 and 25, each reduced-size pivot bushing 111, 111' includes, respectively, an elastic, generally cylindrical-shaped body 113, 113' formed with a central opening 114, 111' which passes completely through the body about its horizontal pivotal axis. A rigid metal sleeve 115, 115' is friction fitted in opening 114, 111' of body 113, 113' and is bonded to the body at the peripheral surface of the sleeve by any suitable adhesive. Sleeve 115, 115' extends slightly outwardly from both ends of opening 114, 111' to provide means for pivotally attaching bushing 111, 111' to suspension hanger 62 by passing a bolt 79 through metal sleeve 115, 115' and a pair of wear pads 116 formed of any suitable plastic, each one of the pair being loosely disposed over a respective one of the ends of the metal sleeve (FIG. 7). Wear pads 116 protect the ends of beam mounting tube 110, each one of the ends of which abuts a respective one of the sidewalls of hanger 62. Metal sleeve 115, 115' can be made of any suitable hard metal such as steel. A pair of spaced-apart voids 117, 117' is formed in each side of elastic body 113, 113' of bushing 111, 111'. More specifically, a generally horizontal, rectangular-shaped void 117 is formed in each of said top and bottom portions of each side of body 113.

Keeping in mind that FIGS. 5 and 6 are inverted views, beam 64 generally is rectangular shaped and includes spaced-apart top and bottom walls 65 and 66, respectively, and spaced-apart inboard and outboard sidewalls 67 and 68, respectively. Top wall 65 is formed integrally with sidewalls 67, 68, and bottom wall 66 extends between, is welded to, and interconnects the sidewalls.

Sidewall 67 is angled rearwardly inboard relative to its respective frame rail 38 (FIG. 7). This rearward inboard disposition of inboard sidewall 67, when combined with the non-angular front-rear disposition of outboard sidewall 68 making it generally parallel to its respective frame rail 38, results in beam 64 having a taper from being narrower at hanger 62, to wider as it fans out rearwardly therefrom. Thus, beam 64 possesses less mass in the lower stressed portion of the beam adjacent to hanger 62 and bushing assembly 63, enabling use of a reduced size/width hanger and bushing 111, 111' of the present invention. However, the tapered design enables beam 64 to possess greater mass in its high stress portions toward the rear of the beam, thus optimizing its weight. An air spring 69 is one factor which places stress on the rear portion of trailing arm beam 64. Air spring 69, formed of any suitable elastomer, is securely mounted on and extends between the upper surface of the rear end of top wall 65 and frame rail 38. Although the width of the front end of beam 64 is less than prior art beams, it can be appreciated that the inboard taper of sidewall 67 enables beam 64 to adequately support air spring 69 (FIG. 7) which is by necessity disposed slightly inboard to avoid interfering with a tire (not shown) of trailer wheel 77. Moreover, the outboard taper of sidewall 67 toward the front of the trailer causes the seat centers of an axle 75, which extends between and is immovably captured in suspension beam 64 and its corresponding opposite suspension beam of axle suspension system 60, to be wider or more outboard than prior art axle seat centers, thus improving the efficiency of the support of axle 75.

A shock absorber 70 extends between and is mounted on inboard sidewall 67 of suspension beam 64 and hanger 62. An air brake chamber 71 of the semi-trailer braking system (only portions shown) is mounted on bottom wall 66 of suspension beam 64 by any suitable means such as welding. A piston 72 of brake chamber 71 in turn is pivotally attached to a slack adjuster 73, which in turn is immovably mounted on a cam shaft 74 of the braking system to provide for transfer of in-line loads from the brake chamber piston into a torsional load on the cam shaft.

As with prior art suspension assemblies, the location of brake chamber 71 on bottom wall 66 of beam 64 necessitates disposition of slack adjuster 73 between sidewalls 67, 68 of the beam.

However, unlike prior art beams, inboard sidewall 67 of beam 64 is free of a cutout for providing access to/removal/replacement of slack adjuster 73. Rather, axle suspension system 60 provides access to/removal/replacement of slack adjuster 73 due to the rearward taper of inboard sidewall 67 providing adequate clearance for access to and especially removal/replacement of the slack adjuster from its location within beam 64, as best shown in FIGS. 5 and 7.

In accordance with yet another major feature of the present invention, reduced-size voided pivot bushing embodiments 111, 111' useful in suspension assembly 61 display desirable multifunctional characteristics heretofore observed only in conventional-size voided pivot bushings of the type shown in FIGS. 9 and 10 and described hereinabove. In contrast, prior art reduced-size solid bushings 121 of the type shown in FIGS. 11–13, while offering smaller size and weight characteristics, have been unsuccessful in achieving the desirable multifunctional characteristics of their conventional-size voided counterparts. Prior art reduced-size solid bushing 121 includes an elastic, generally cylindrical-shaped body 123 formed with a central opening 124 which passes completely through the body about its horizontal pivotal axis. A rigid metal sleeve 125 is friction fitted in opening 124 of body 123, and is bonded to the body at the peripheral surface of the sleeve by any suitable adhesive. Sleeve 125 extends slightly outwardly from both ends of opening 124 to provide means for pivotally attaching bushing 121 to a hanger of a suspension assembly as has been described above for reduced-size voided pivot bushings 111, 111' of the present invention. Elastic body 123, when used in tractor-trailer suspensions having a GAWR of from about 18,000 lbs. to about 25,000 lbs., is formed of natural rubber having a durometer of from about 50 to about 75. Metal sleeve 125 is made of any hard metal such as steel. Although reduced-size solid pivot bushing 121 provides the required vertical load-deflection found in bushings exhibiting multifunctional characteristics, bushing 121 fails to provide adequate horizontal load-deflection. Specifically, horizontal load-deflection controls the lateral or side-to-side motion of suspension system 60. Solid bushing 121 allows unacceptable excessive lateral motion due to its lower load-deflection characteristics in the horizontal direction. Moreover, and as best shown in FIG. 14, when subjected to loading conditions of the type encountered in service in air-ride, beam-type trailing arm axle suspension system 60, bushing 121 exhibited reduced durability as evidenced by crack initiation C of bushing body 123 from friction fitted adhesively bonded bushing metal sleeve 125. The high strain gradient at the metal sleeve 125 to bushing body central opening 124 interface caused the premature cracking during the suspension fatigue test. Also, it should be noted that when reduced-size solid bushing 121 is press-fitted into a beam mounting tube 120 in a usual manner, another problem is observed (FIGS. 14 and 15). Since the width of reduced-size solid bushing 121 is reduced by about fifty percent of the width of conventional-size bushing 101, the contact surface area and resulting compression fit between the peripheral surface of bushing body 123 and the inner surface of mounting tube 120 also is reduced. Such reduced compression fit can cause unsatisfactory side-to-side or even twisting movement of bushing 121 in mounting tube 120, which in turn can cause premature wear of suspension components. Finally, and as best shown in FIG. 15, press fitting of solid bushing 121 in mounting tube 120 causes the normally linear tapering sides of bushing 121 (FIG. 13) to bulge outwardly, thus further reducing the contact surface area between the bushing and the mounting tube. Specifically, the contact surface area is reduced because the width of bushing body 123 must be significantly less than the width of mounting tube 120, otherwise the bulging sides of bushing 121 would extend outwardly from the ends of the mounting tube, thus making it impossible to mount bushing assembly 63 within hanger 62.

First embodiment reduced-size voided pivot bushing 111 of the present invention useful in air-ride beam-type axle suspension systems of the type indicated at 60 and shown and described herein, having been briefly generally described hereinabove is now described in greater detail and is shown in FIGS. 16 through 24. As best shown in FIG. 18, the widths W and $W_2$ of elastic bushing body 113, like the width of reduced-size solid bushing body 123, each is about fifty percent of the width of conventional-size voided bushing 101, but its diameter D is larger than bushings 101 and 121 by about one-quarter of an inch. Specifically, W is about 2.35 inches and $W_2$ is about 2.82 inches and D is about 6.25 inches.

Also, in contrast to reduced-size solid bushing 121, the profile of bushing 111 of the present invention is significantly different. Specifically, rather than having constant linear tapering sides and decreasing width moving away from metal sleeve 125 of reduced-size solid bushing 121 as shown in FIG. 13, reduced-size voided bushing 111 has two distinct surface profiles on each of its sides. A first surface profile exists generally about an imaginary horizontal line parallel to section line 20—20 shown in FIG. 17, and can be described as generally concave (FIGS. 18A and 20). A second surface profile exists generally about an imaginary vertical line parallel to section line 19—19 shown in FIG. 17, and can be described as generally concave from the radially inner most edge of each void 117 and on inward to metal sleeve 115. From the radially outermost edge of each void 117 and on outward to the periphery or end of elastic body 113, the second surface profile can be described as generally sidewardly protruding as best shown in FIGS. 16–19.

It is also important to note that reduced-size solid bushing 121 has a radiused or rounded edge R between each of its sides and its peripheral end, as best shown in FIGS. 11 and 13. In contrast, and as best shown in FIGS. 16, and 18 through 20, the corresponding edge S' of reduced-size voided bushing 111 is generally free of a pronounced radius or rounding and is sharper in shape.

Also, the durometer range of reduced-size solid bushing 121 is from about 50 to about 75. In further contrast, elastic body 113, when used in tractor-trailer suspensions having a GAWR from about 18,000 lbs. to about 25,000 lbs., preferably is formed of natural rubber having a durometer of from about 75 to about 90, more preferably from about 75 to about 84, and most preferably from about 75 to about 79, with the rubber being available from the Goodyear Tire & Rubber Company of Akron, Ohio.

In accordance with still another important feature of the present invention, and as best shown in FIGS. 16–17 and 19, each void 117 is a generally horizontal rectangular slot having radiused or rounded edges and generally rounded ends.

It should be noted that the total area of each void preferably is from about 2.17 square inches to about 2.89 square inches, more preferably from about 2.23 to about 2.77 square inches, and most preferably from about 2.29 to about 2.65 square inches. Moreover, and as best shown in FIG. 17, it is important to note that the total area of each void 117 which extends outwardly beyond a pair of spaced, imaginary vertical lines $T_f$ and $T_r$, respectively, which are tangential to the front and rear outer surfaces of metal sleeve 115, preferably is from about 27 percent to about 46 percent of the total area of each void 117, more preferably from about 29 percent to about 43 percent, and most preferably from about 31 percent to about 40 percent of the total area of each of the voids.

Thus, first embodiment reduced-size voided bushing 111 of the present invention overcomes all of the problems associated with prior art reduced-size solid bushing 121. Specifically, the combination of the variable concave/protruding side profile and unradiused side to peripheral edge profile of bushing 111, together with elongated straight horizontal voids 117 having generally rounded ends and choice of rubber durometer, enables bushing 111 to achieve the multifunctional characteristics heretofore demonstrated only in conventional-size voided bushing 101. Specifically, the multifunctional characteristics of bushing 111 include required load and deflection ratios, or static rates, of varying levels in different directions for semi-trailer axle suspension system applications. The bushing static rate is stiff in the horizontal radial direction, so that axle suspension system 60 remains substantially perpendicular to the direction of movement of the vehicle despite horizontal loading which may be placed on the suspension system, and relatively soft in the vertical radial direction, to enable the suspension system and bushing 111 to absorb vertical loading shocks and provide proper roll-stability for the trailer. It should further be noted that the shape and positioning of voids 117 is important for other reasons as well. The slightly rounded ends of each void 117 assists in preventing premature crack sites in bushing body 113 adjacent to the ends of voids 117 by reducing localized buckling or puckering. Moreover, the above-described combination of features of bushing 111 prevents the type of cracking observed in reduced-size solid bushing 121 as shown in FIG. 14, namely, cracking separation of bushing body 123 from metal sleeve 125.

Moreover, the protruding portions of the sides of bushing 111, combined with the larger outside diameter of the bushing prevent the migration and twisting problem described hereinabove for prior art solid bushing 121. More specifically, the larger diameter of bushing body 113 enables greater compression force when bushing 111 is press fitted into beam mounting tube 110, as best shown in FIGS. 21–24. This compression force of bushing body 113 against beam mounting tube 110 is about 19 percent compared to about 13 percent for solid bushing 121, which translates to increased interference pressure to hold bushing 111 in place in tube 110. The variable concave/protruding side profile and unradiused side to periphery edge profile of bushing 111 also increases the contact surface area and resulting compression between the peripheral surface of bushing body 113 and the inner surface of mounting tube 110. Thus, as best shown in FIGS. 23 and 24, and in contrast to what is shown in FIG. 15 for prior art solid bushing 121, mounting tube 110 is substantially filled by bushing 111. This filling of mounting tube 110 assists bushing 111 in achieving its multifunctional characteristics, and also helps prevent bushing migration or twisting. The choice of durometer of bushing body 113 in combination with the variable side profile, unradiused side to periphery edge profile, and void shape and position, thus all contributes to achieving the multifunctional characteristics.

Second embodiment reduced-size voided pivot bushing 111' of the present invention useful in air-ride beam-type axle suspension systems of the type indicated at 60 and shown and described herein, having been briefly generally described hereinabove is now described in greater detail and is shown in FIGS. 25 through 32. As best shown in FIG. 27, the width W' of elastic bushing body 113', like the width of reduced-size solid bushing body 123, is about 50 percent of the width of conventional size voided bushing 101, but its diameter D' is larger than bushings 101 and 121 by about one-quarter of an inch. Specifically, W' is about 2.37 inches and D' is about 6.25 inches.

Also, in contrast to reduced-size solid bushing 121, the profile of bushing 111' of the present invention is significantly different. Specifically, rather than having constant linear tapering sides and decreasing width moving away from metal sleeve 125 of reduced-size solid bushing 121 as shown in FIG. 13, reduced-size voided bushing 111' has a surface profile that can best be described as generally concave, as best shown in FIGS. 25 and 27–28.

It is also important to note that reduced-size solid bushing 121 has a radiused or rounded edge R between each of its sides and its peripheral end, as best shown in FIGS. 1 1and 13. In contrast, and as best shown in FIGS. 25 and 27–28, the corresponding edge S of reduced-size voided bushing 111' is generally free of a pronounced radius or rounding and is sharper in shape.

Also, the durometer range of reduced-size solid bushing 121 is from about 50 to about 75. In further contrast, elastic body 113', when used in tractor-trailer suspensions having a GAWR from about 18,000 lbs. to about 25,000 lbs., preferably is formed of natural rubber having a durometer of from about 75 to about 90, more preferably from about 78 to 88, and most preferably from about 82 to about 86, with the rubber being available from the Goodyear Tire & Rubber Company of Akron, Ohio.

In accordance with still another feature of the present invention, and as best shown in FIGS. 25 to 26, each void 117' is a generally horizontal rectangular slot having generally rounded ends.

It should be noted that the total area of each void preferably is from about 1.93 square inches to about 2.59 square inches, more preferably from about 1.99 to about 2.48 square inches, and most preferably from about 2.04 to about 2.37 square inches. Moreover, and as best shown in FIG. 26, it is important to note that the total area of each void 117' which extends outwardly beyond a pair of spaced, imaginary vertical lines $T'_f$ and $T'_r$, respectively, which are tangential to the front and rear outer surfaces of metal sleeve 115', preferably is from about 21 percent to about 35 percent of the total area of each void 117', more preferably from about 23 percent to about 31 percent, and most preferably from about 25 percent to about 27 percent of the total area of each of the voids.

Thus, second embodiment reduced-size voided bushing 111' of the present invention overcomes all of the problems associated with prior art reduced-size solid bushing 121. Specifically, the combination of the side concavity profile and unradiused side to periphery edge profile of bushing 111', together with elongated straight horizontal voids 117' having rounded ends and choice of rubber durometer, enables bushing 111' to achieve the multifunctional characteristics heretofore demonstrated only in conventional-size voided bushing 101. Specifically, the multifunctional characteristics of bushing 111' include required load and deflection ratios, or static rates, of varying levels in different directions for semi-trailer axle suspension system applications. The bushing static rate is stiff in the horizontal radial direction, so that axle suspension system 60 remains substantially perpendicular to the direction of movement of the vehicle despite horizontal loading which may be placed on the suspension system, and relatively soft in the vertical radial direction, to enable the suspension system and bushing 111' to absorb vertical loading shocks and provide proper roll-stability for the trailer. It should be further noted that the shape and positioning of voids 117' is important for other reasons as well. The slightly rounded ends of each void 117' assists in preventing premature crack sites in bushing body 113' adjacent to the ends of voids 117' by reducing localized buckling or puckering. Moreover, the above-described combination of features of bushing 111' prevents the type of cracking observed in reduced-size solid bushing 121 as shown in FIG. 14, namely, cracking separation of bushing body 123 from metal sleeve 125.

Moreover, the larger outside diameter of bushing 111' assists in preventing the migration and twisting problem described hereinabove for prior art solid bushing 121. More specifically, the larger diameter of bushing body 113' enables greater compression force when bushing 111' is press-fitted into beam mounting tube 110, as best shown in FIGS. 29–32. This compression force of bushing body 113' against beam mounting tube 110 is about 19 percent compared to about 13 percent for solid bushing 121, which translates to increased interference pressure to hold bushing 111' in place in tube 110. The concave side profile and unradiused side to periphery edge profile of bushing 111' also increases the contact surface area and resulting compression between the peripheral surface of bushing body 113' and the inner surface of mounting tube 110. Thus, as best shown in FIGS. 31 and 32, and in contrast to what is shown in FIG. 15 for prior art solid bushing 121, mounting tube 110 is substantially filled by bushing 111'. This filling of mounting tube 110 assists bushing 111' in achieving its multifunctional characteristics, and also helps prevent bushing migration or twisting. The choice of durometer of bushing body 113' in combination with the concave side profile and unradiused side to periphery edge profile, as well as the void shape and position, thus all contributes to achieving the multifunctional characteristics.

Thus, axle suspension system 60 shown in FIGS. 5–8 and 16–32, and described above, can employ smaller width improved bushings 111, 111' in suspension assembly 61, and the improved bushings have been designed to be durable as well as to withstand static loads, roll moments and braking forces encountered during normal operation of the semi-trailer.

Thus, it can be seen that use of a reduced size bushing having durability and multifunctional characteristics provides certain advantages and solves many problems. It is understood that the concepts of the present invention can be applied to wheeled vehicles other than semi-trailers or heavy trucks. It is also understood that these concepts also apply to front arm or leading arm suspensions as well as trailing arm suspensions.

Accordingly, the improved air-ride beam-type axle suspension system for wheeled vehicles incorporating a reduced-size bushing is simplified, provides an effective, safe, inexpensive, and efficient system which achieves all the enumerated objectives, provides for eliminating difficulties encountered with prior beam-type air suspension systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved beam-type air suspension system is constructed, arranged and used, the characteristics of the construction and arrangement, and the advantageous, new and useful results obtained; the new and useful structures, devices, elements, arrangements, parts and combinations are set forth in the appended claims.

We claim:

1. A bushing for a vehicle suspension, said bushing including:
   a) an elastic, generally cylindrical-shaped body having a pair of spaced-apart generally concave sides and being formed with a central opening which passes completely through said body and each of said sides about a horizontal pivotal axis of the body, said body having an edge formed at an interface of each of said sides with a peripheral end of said body, said edge generally being free of a radius;
   b) a mounting tube in which said elastic body is mountable, whereby said concave sides generally flatten enabling the elastic body to substantially fill said tube;
   c) a rigid sleeve immovably mounted in said central opening, said rigid sleeve outside diameter being generally equal to the central opening diameter, the sleeve extending substantially the entire width of said central opening to facilitate mounting of said bushing on a vehicle suspension; and
   d) a pair of spaced apart voids formed in each of said elastic body sides, said pair of voids being formed in each of the sides above and below the central opening, and an imaginary vertical center of each of said voids being disposed about 90 degrees from an imaginary horizontal plane passing transversely through the body when said bushing is mounted on a vehicle suspension, said voids each being generally horizontal rectangular-shaped, said elastic body being generally solid apart from said voids and said central opening, so that said bushing is more rigid in the direction of said horizontal plane than in the direction of said vertical center when said vehicle suspension is subjected to horizontal and vertical loads, respectively.

2. The bushing of claim 1, in which said bushing body has a width of about 2.4 inches at said peripheral end and a diameter of about 6.25 inches: in which the bushing body is press-fitted in said mounting tube; and in which said bushing body is formed of natural rubber having a durometer of from about 75 to about 90.

3. The bushing of claim 1, in which said bushing body is formed of natural rubber having a durometer of from about 78 to about 88.

4. The bushing of claim 1, in which said bushing body is formed of natural rubber having a durometer of from about 82 to about 86.

5. The bushing of claim 1, in which the area of each of said voids is from about 1.93 square inches to about 2.59 square inches.

6. The bushing of claim 1, in which the area of each of said voids is from about 1.99 square inches to about 2.48 square inches.

7. The bushing of claim 1, in which the area of each of said voids is from about 2.04 square inches to about 2.37 square inches.

8. The bushing of claim 1, in which from about 21 percent to about 35 percent of the total area of each of said voids extends beyond an area bounded by a pair of spaced imaginary vertical lines located tangential to an outer surface of said sleeve.

9. The bushing of claim 1, in which from about 23 percent to about 31 percent of the total area of each of said voids extends beyond an area bounded by a pair of spaced imaginary vertical lines located tangential to an outer surface of said sleeve.

10. The bushing of claim 1, in which from about 25 percent to about 27 percent of the total area of each of said voids extends beyond an area bounded by a pair of spaced imaginary vertical lines located tangential to an outer surface of said sleeve.

11. A bushing for a vehicle suspension, said bushing including:
    a) an elastic, generally cylindrical-shaped body having a pair of spaced-apart sides and being formed with a central opening which passes completely through said body and each of said sides about a horizontal pivotal axis of the body, said body having an edge formed at an interface of each of said sides with a peripheral end of said body, and said edge generally being free of a radius;
    b) a mounting tube in which said elastic body is mountable, whereby said concave sides generally flatten enabling the elastic body to substantially fill said tube;
    c) a rigid sleeve immovably mounted in said central opening, said rigid sleeve outside diameter being generally equal to the central opening diameter, the sleeve extending substantially the entire width of said central opening to facilitate mounting of said bushing on a vehicle suspension; and
    d) a pair of spaced apart voids formed in each of said elastic body sides, said pair of voids being formed in each of the sides above and below the central opening, and an imaginary vertical center of each of said voids being disposed about 90 degrees from an imaginary horizontal plane passing transversely through the body when said bushing is mounted on a vehicle suspension, said voids each being generally horizontal rectangular-shaped, said elastic body being generally solid apart from said voids and said central opening, said sides each having a generally concave shape about said imaginary horizontal plane, and a generally sidewardly protruding shape from a radially outermost edge of each of said voids outward to said peripheral end of said elastic body, so that said bushing is more rigid in the direction of said horizontal plane than in the direction of said vertical center when said vehicle suspension is subjected to horizontal and vertical loads, respectively.

12. The bushing of claim 11, in which said body has a variable width of from about 2.3 inches to about 2.8 inches at said peripheral end and a diameter of about 6.25 inches; in which the bushing body is press-fitted in said mounting tube; and in which said bushing body is formed of natural rubber having a durometer of from about 75 to about 90.

13. The bushing of claim 11, in which said bushing body is formed of natural rubber having a durometer of from about 75 to about 84.

14. The bushing of claim 11, in which said bushing body is formed of natural rubber having a durometer of from about 75 to about 79.

15. The bushing of claim 11, in which the area of each of said voids is from about 2.17 square inches to about 2.89 square inches.

16. The bushing of claim 11, in which the area of each of said voids is from about 2.23 square inches to about 2.77 square inches.

17. The bushing of claim 11, in which the area of each of said voids is from about 2.29 square inches to about 2.65 square inches.

18. The bushing of claim 11, in which from about 27 percent to about 46 percent of the total area of each of said voids extends beyond an area bounded by a pair of spaced imaginary vertical lines located tangential to an outer surface of said sleeve.

19. The bushing of claim 11, in which from about 29 percent to about 43 percent of the total area of each of said voids extends beyond an area bounded by a pair of spaced imaginary vertical lines located tangential to an outer surface of said sleeve.

20. The bushing of claim 11, in which from about 31 percent to about 40 percent of the total area of each of said voids extends beyond an area bounded by a pair of spaced imaginary vertical lines located tangential to an outer surface of said sleeve.

* * * * *